(12) United States Patent
Young

(10) Patent No.: US 6,333,695 B2
(45) Date of Patent: *Dec. 25, 2001

(54) APPARATUS FOR FLOW DETECTION, MEASUREMENT AND CONTROL AND METHOD FOR USE OF SAME IN A FIRE SPRINKLER SYSTEM

(76) Inventor: Richard Young, 2921 NW. 160$^{TH}$, Edmond, OK (US) 73013

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/567,510

(22) Filed: May 8, 2000

Related U.S. Application Data

(63) Continuation-in-part of application No. 09/483,999, filed on Jan. 18, 2000, which is a continuation-in-part of application No. 09/098,976, filed on Jun. 17, 1998, now Pat. No. 6,081,196.

(51) Int. Cl.$^7$ .................................................. G08B 21/00
(52) U.S. Cl. ............................. 340/606; 340/611; 73/251
(58) Field of Search ................................... 340/606, 607, 340/608, 609, 610, 611, 618; 73/251, 242, 273, 861.56, 861.61; 165/48.1, 53, 56; 269/16, 19, 331

(56) References Cited

U.S. PATENT DOCUMENTS

| | | | |
|---|---|---|---|
| 3,876,009 | 4/1975 | Johnson, Jr. ............................. | 169/24 |
| 4,096,747 | * 6/1978 | Gilson ..................................... | 73/251 |
| 4,286,667 | * 9/1981 | Westenhofer et al. .................. | 169/16 |
| 4,791,414 | 12/1988 | Griess ..................................... | 340/606 |
| 4,805,701 | 2/1989 | Mountford .............................. | 169/57 |
| 5,056,712 | * 10/1991 | Enck ..................................... | 236/25 R |
| 5,085,076 | 2/1992 | Engelmann ............................. | 73/197 |
| 5,139,044 | 8/1992 | Otten et al. ............................. | 137/80 |
| 5,228,469 | 7/1993 | Otten et al. ............................. | 137/80 |
| 5,236,002 | 8/1993 | Martin et al. .......................... | 137/119.06 |
| 5,419,203 | 5/1995 | Carmichael ........................ | 73/861.58 |
| 5,483,838 | 1/1996 | Holden ............................... | 73/861.61 |
| 5,546,801 | 8/1996 | Swinson et al. ....................... | 73/273 |
| 5,988,264 | * 11/1999 | Goldsmith .......................... | 165/48.1 |

OTHER PUBLICATIONS

Potter Marketing Brochures showing flow meters with alarm outputs.

* cited by examiner

*Primary Examiner*—Van Trieu
(74) *Attorney, Agent, or Firm*—Edward L. White

(57) ABSTRACT

An apparatus for flow detection, measurement and control and method for use of same in a piping and/or fire sprinkler system. The apparatus combines a flow sensor for creating an electrical output proportional to flow through therethrough with a bypass means for allowing flow through an alternate flow path where a primary flow path is insufficient to supply the demand. The apparatus includes a moving orifice plate, which is displaced by flow through the sensor and creates an electronic output by the interaction of a moving magnet moving in tandem with the orifice plate with a normally closed Reed switch on an exterior surface of the sensor, which is opened when the magnet is displaced into sufficiently close proximity to the Reed switch. The apparatus can also be adapted to serve as a double check valve. A moving check is added with a sealing means thereon for providing one check, and sealing means on the orifice plate are provided to serve as a second check. A method of using said apparatus in a piping and/or fire protection system is disclosed. The method allows a bypass of flow restrictions such as a water softener. The method also provides for re-circulation of heated water through a fire protection system to prevent stagnation and freezing of water in the system. The method can be used with a multipurpose piping system having both fire sprinklers and domestic uses supplied thereby.

20 Claims, 10 Drawing Sheets

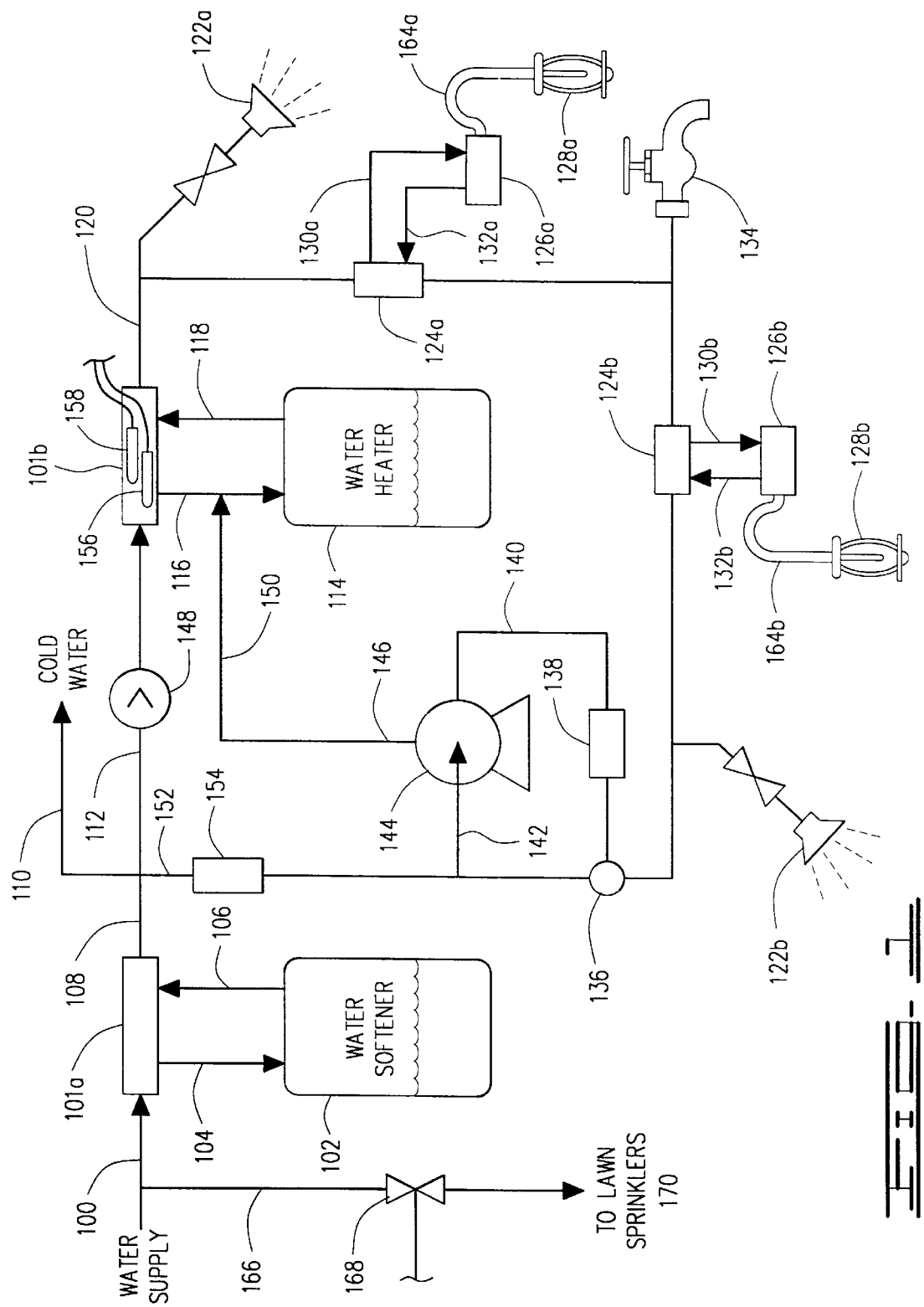

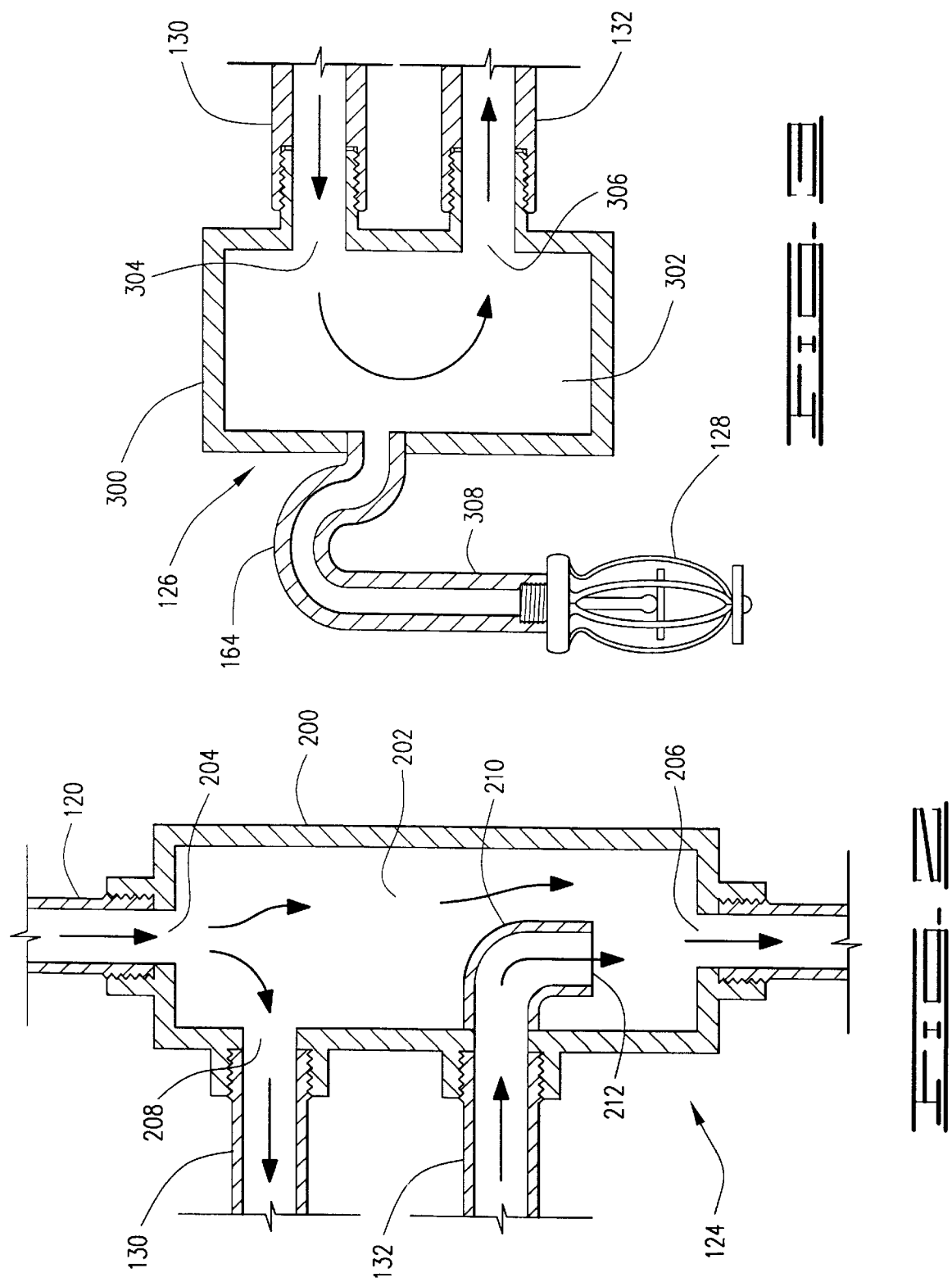

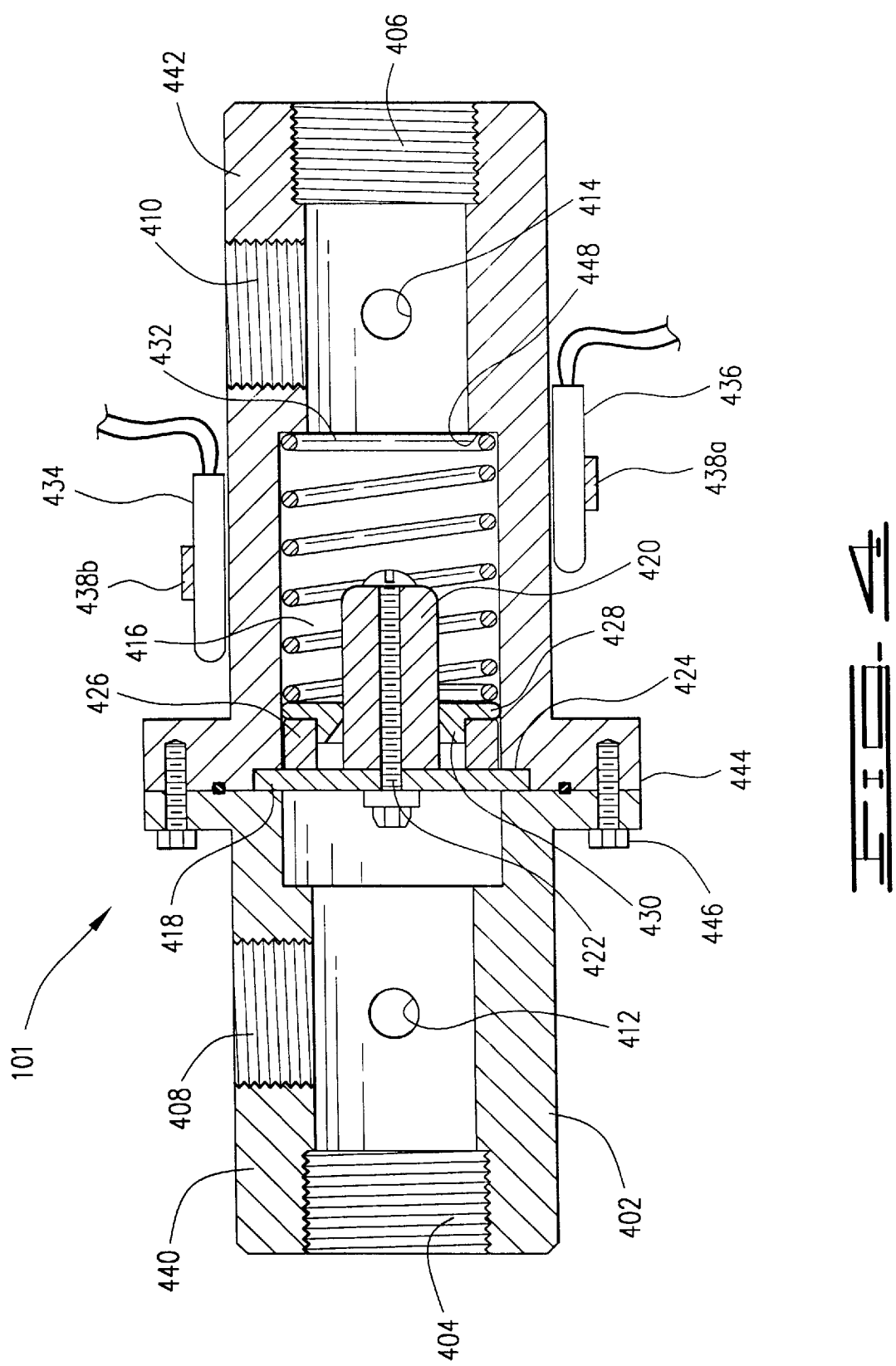

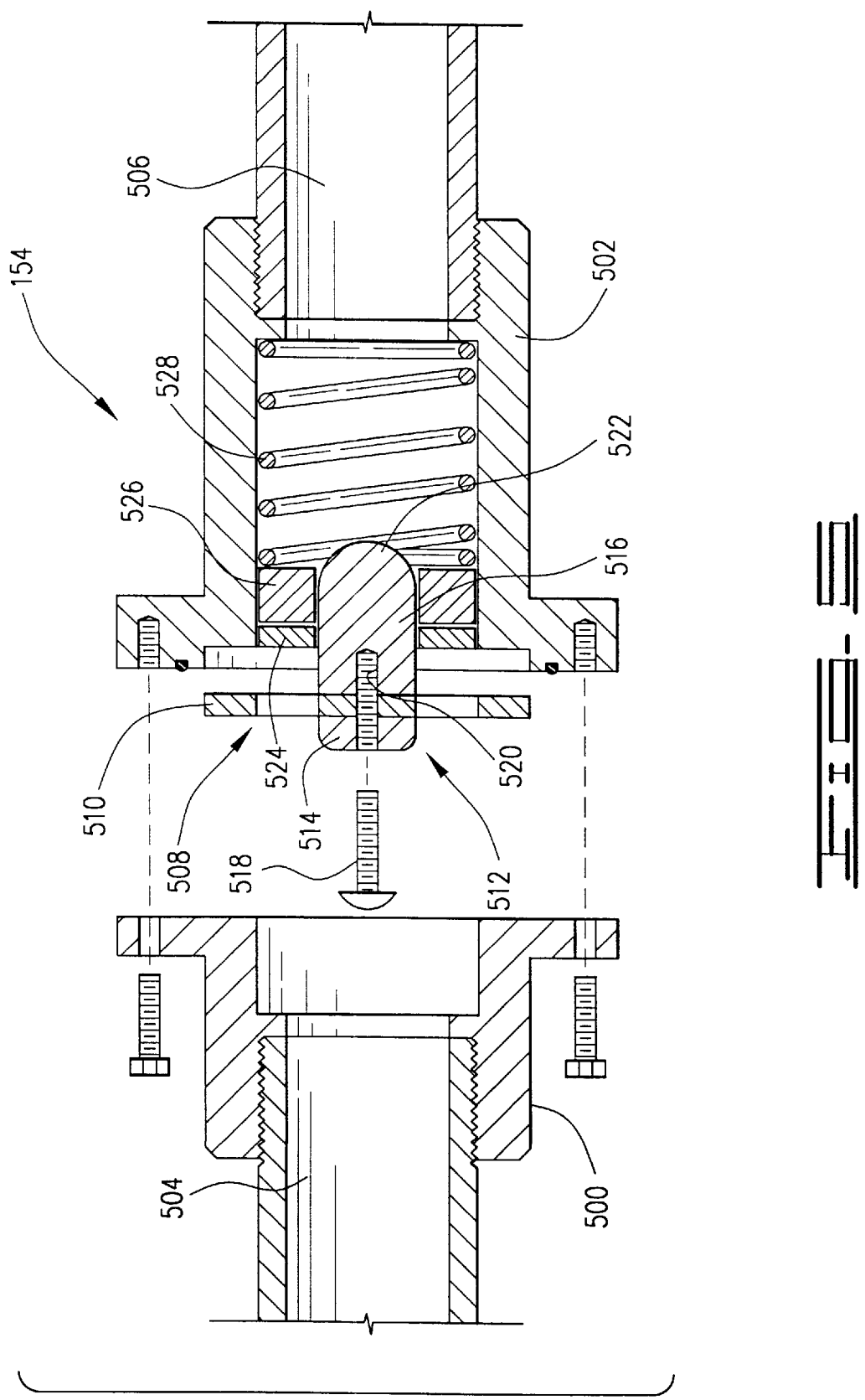

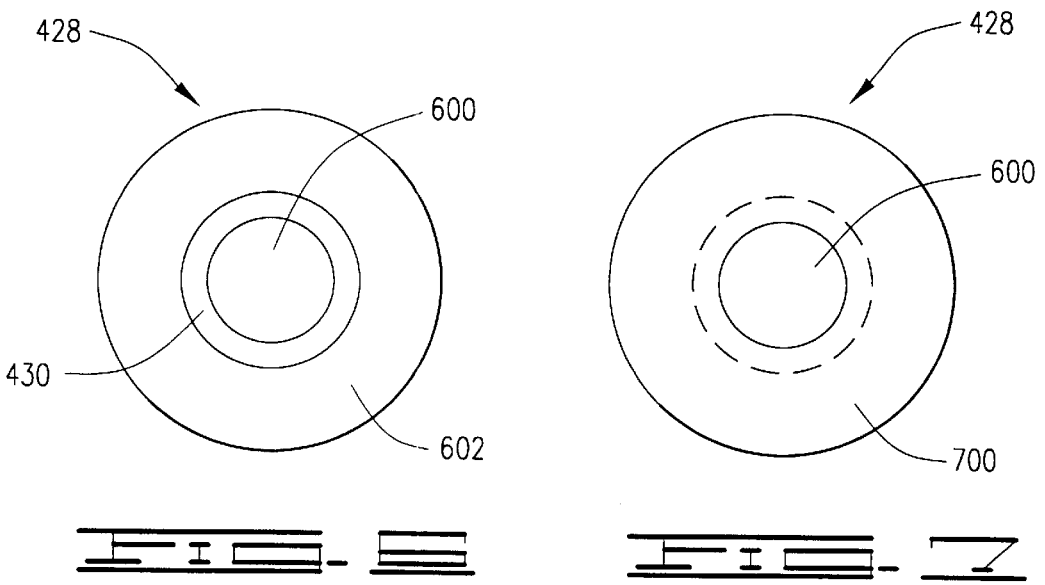
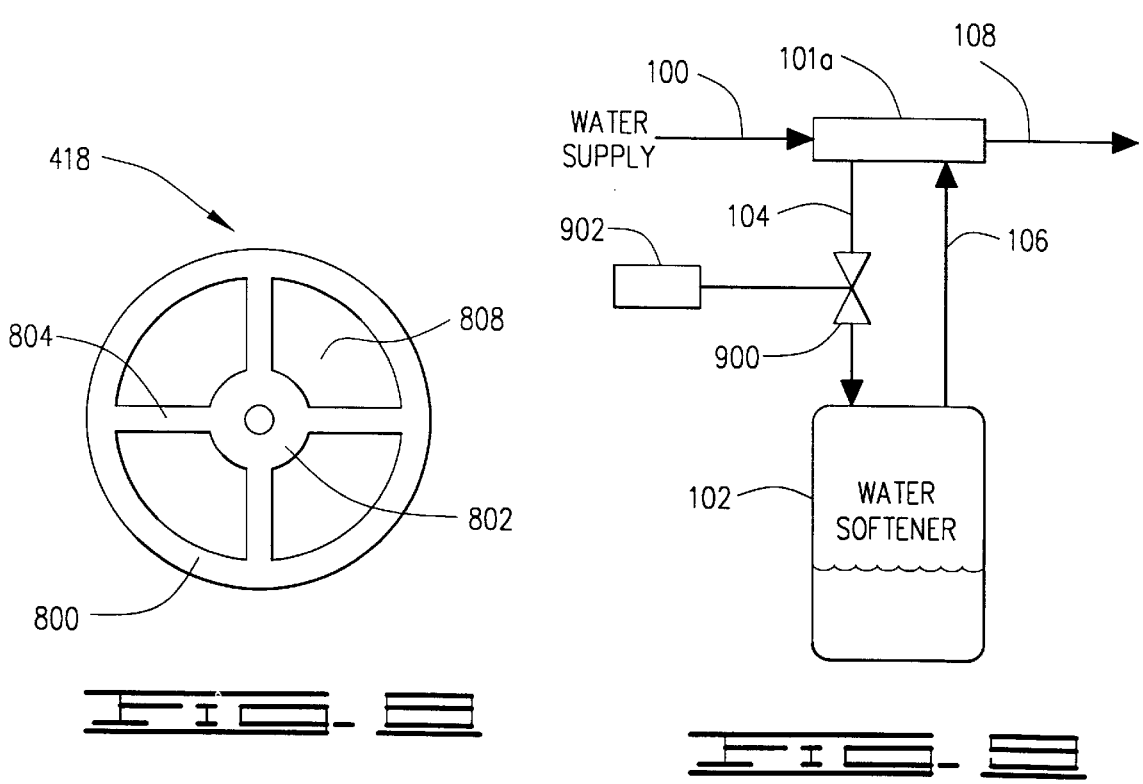

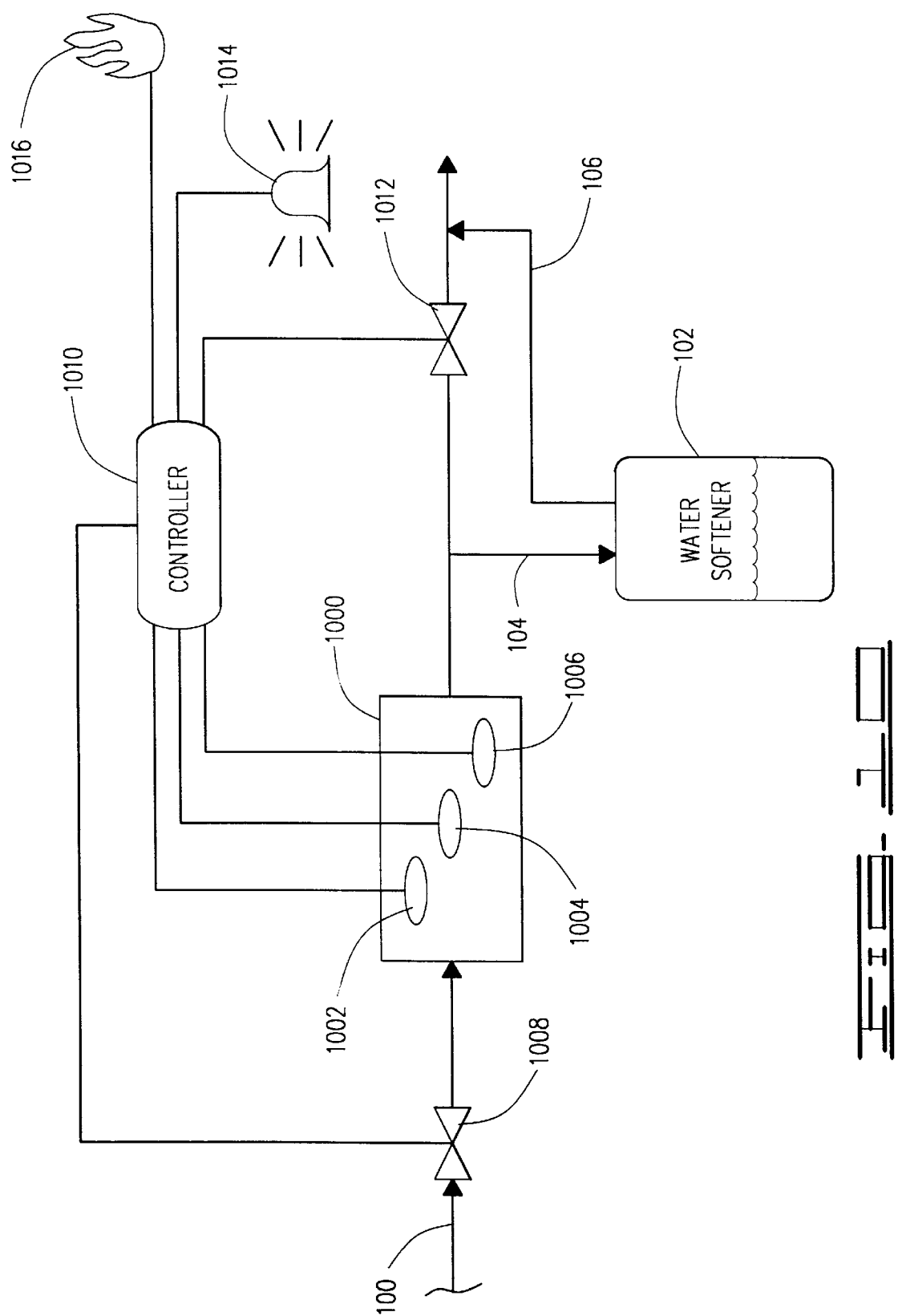

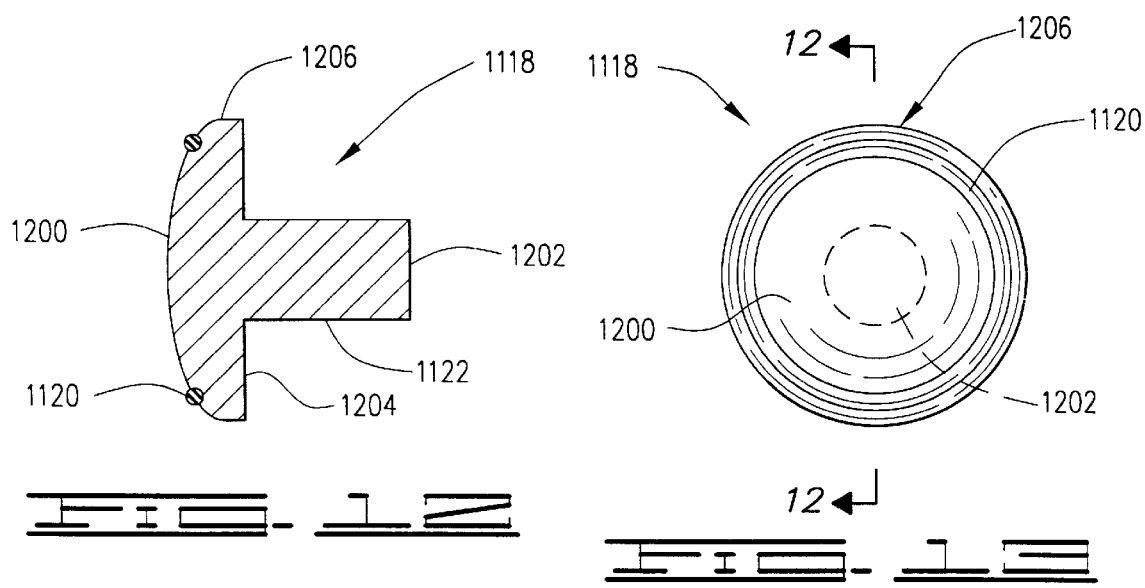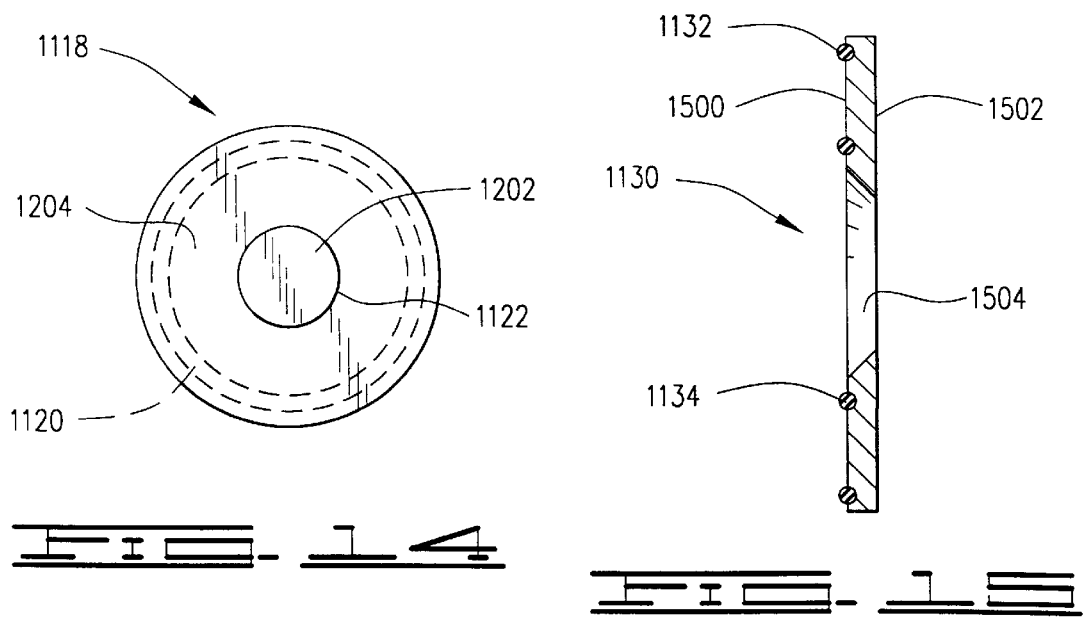

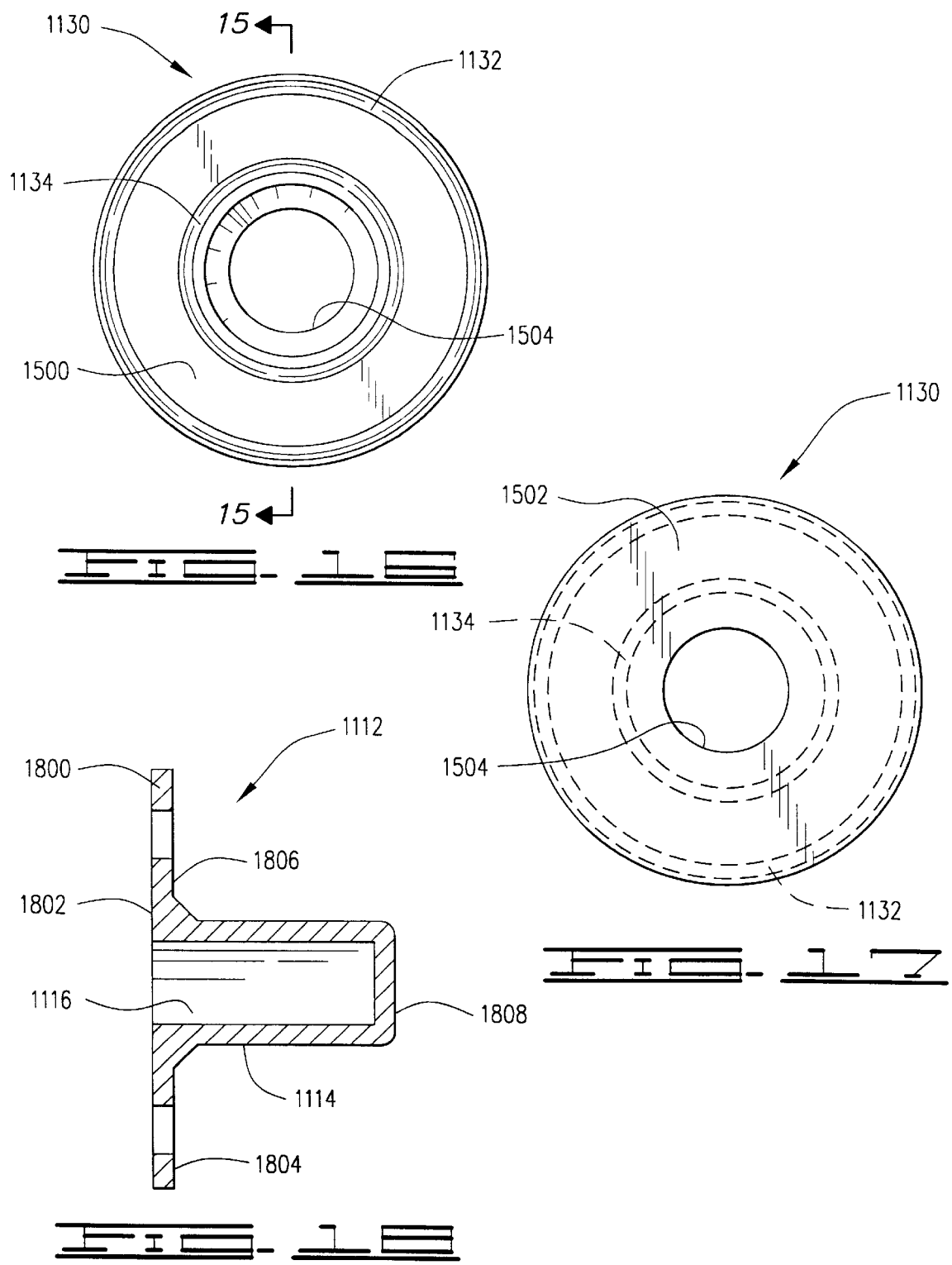

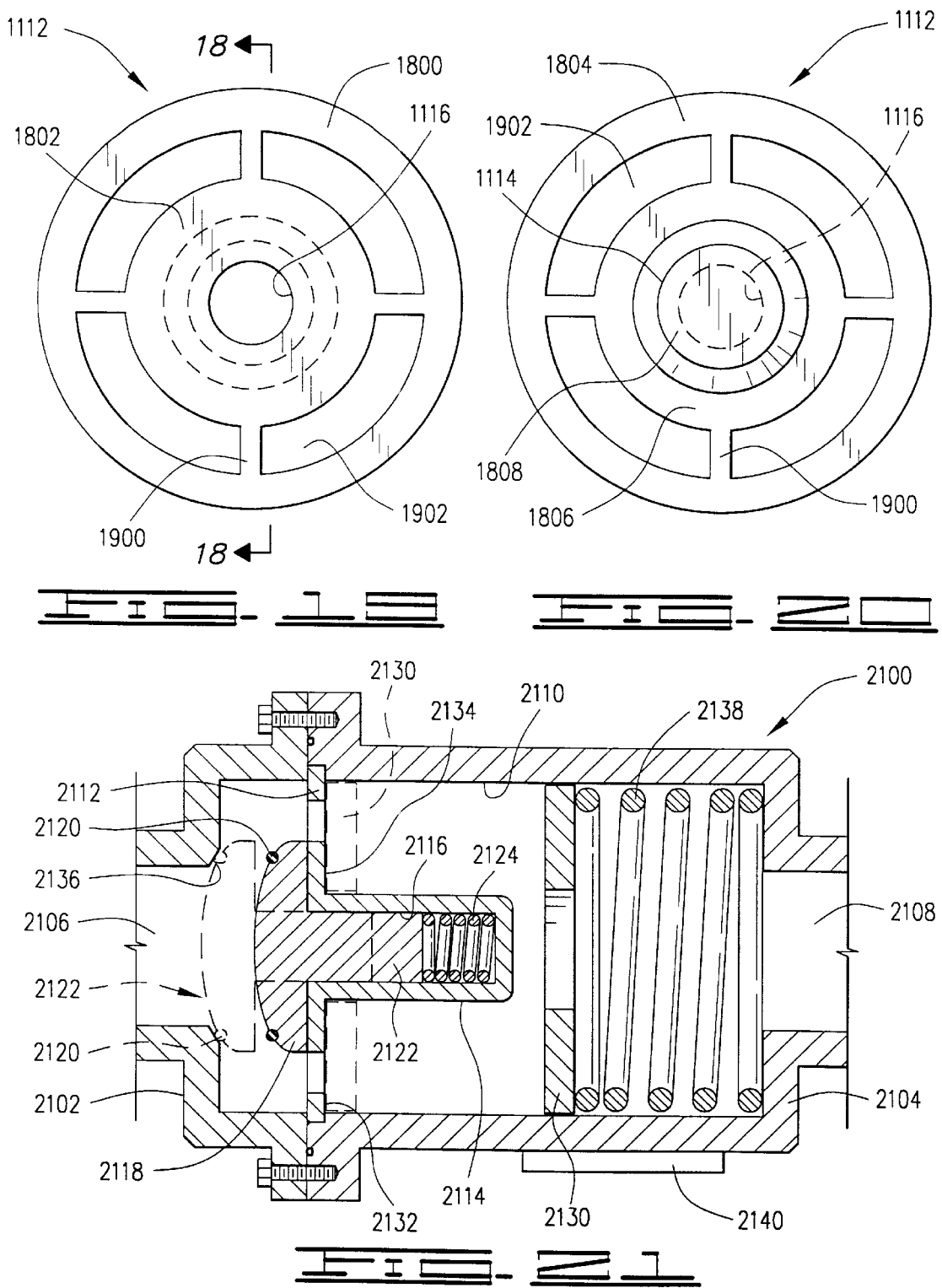

APPARATUS FOR FLOW DETECTION, MEASUREMENT AND CONTROL AND METHOD FOR USE OF SAME IN A FIRE SPRINKLER SYSTEM

CROSS REFERENCE TO RELATED APPLICATIONS

This application is a continuation-in-part of Ser. No. 09/483,999 filed Jan. 18, 2000, which was a continuation-in-part of Ser. Nos. 09/098,976 filed Jun. 17, 1998, now U.S. Pat. No. 6,081,196 (hereinafter collectively referred to as the "Parent Applications").

BACKGROUND OF THE INVENTION

1. Field of the Invention

The invention relates to the fields of flow detection, measurement and control. The invention also relates to fire suppression systems. In particular, the invention relates to multi-purpose piping systems for fire protection in structures and flow elements related thereto. The invention relates to systems for ensuring adequate circulation to fire protection sprinklers to minimize stagnation and/or freezing.

2. Description of the Prior Art

Practically any system where fluid flows in a conduit can use flow measurement devices. There are any many different kinds of flow measurement devices as there are systems where fluids flow in a conduit (such as a typical pipe). For example, it is well known that there is a pressure drop across an orifice plate, and that this pressure drop can be used to determine the fluid flow through the pipe. The pressure drop is proportional to the velocity of the fluid in the pipe. As another example, a positive displacement device may be placed in a conduit, which directly measures the volume of fluid flowing therethrough. From the known volume measured by the positive displacement device, the velocity of the fluid in the pipe can be determined. An example of this type device is a paddle flow switch commonly used in fire protection systems. Each type of flow measurement device has its strengths and weaknesses, and may be applicable to one system, while not being suitable for another.

Check valves (single and double acting) are also widely used in systems where fluids flow in conduits. The purpose of a check valve is to allow flow in one desired direction, but prevent flow in the opposite undesired direction. Existing check valves often use a moving seat, which is forced open by fluid flowing in the desired direction, but which moving seat is sealingly forced against an annular shoulder, preventing flow in the undesired, opposite direction.

It is well known to use electronic sensor means to transmit a signal generated by a flow measurement device to a read out or alarm means. The electronic output may be generated in response to a pressure transducer or the like. There are a myriad of ways to generate an electronic signal proportional to flow of a fluid in a conduit. As with our orifice plate noted above, the differential pressure is proportional to the flow in the conduit. Therefore, a differential pressure transducer exposed to the up stream and down stream fluids would produce an output electrical signal proportional to the flow of fluid through the conduit. In the paddle flow switch, the volume between the paddles is known, and a signal is generated indicating the number of revolutions per unit time of the paddle, thus allowing calculation of the flow velocity. Vane-type paddle flow switches are typically used in the fire protection industry.

It is also well known to provide a bypass means for allowing fluid flow around a restriction, in certain circumstances. For example, for use in a multi-purpose piping system, it made be desirable to divert flow around a water softener where the demand for water in the residence for fire protection is greater than is able to flow through the water softener. As another example, in a chemical process, chemicals may be passed through a reactor unit. However, should the reactor become plugged or otherwise unduly restrict the flow, it may be desirable to bypass the reactor so as to prevent damage to the reactor vessel and/or a process upset. In these circumstances, it is necessary to have a bypass means which can divert flow around the flow element causing the pressure drop in certain circumstances.

In most fluid flow systems, each of the above noted flow elements (flow measurement, check valve, bypass means) is a separate fitting which must be placed in the fluid system. It is often desirable to combine as many of the above noted functions into one device as possible. The combination of multiple devices, for example the flow meter, check valve, and means for converting a fluid flow to an electronic out put signal, are obvious. A reduced number of devices reduces complexity, cost, and difficulty of installation of a fluid flow system.

It is also well known to provide a means for enunciating an alarm when water flows through a fire protection system. Typical commercial fire protection systems do not have significant water flow therethrough unless a sprinkler head is activated by a fire. Thus, the typical commercial system need only to detect whether or not flow is present, and if so, an alarm must be enunciated.

In application Ser. Number 09/098,976 filed on Jun. 1, 1998, for an Apparatus And Method For Multi-purpose Residential Water Flow Fire Alarm, a method was disclosed which allows the same piping to be used for both domestic and fire protection needs. The method provided for a flow detection and measurement means which is capable of distinguishing typical domestic flow from fire protection flow caused by the operation of one or more sprinkler heads.

The National Fire Protection Association ("NFPA") has established standards for the design and operation of multi-purpose residential fire sprinkler systems. The standard is known as NFPA 13D, 1999 Ed. It defines a multi-purpose piping system ("MPS") "piping system within dwellings and manufactured homes intended to serve both domestic and fire protection needs."

Typical commercial fire sprinkler systems utilize a water flow detector to provide an alarm means. When a flow of sufficient, minimal, volume is detected, typical commercial systems indicate an alarm condition. The only reason that water typically flows in commercial systems is activation of a sprinkler head. Therefore, in a typical commercial system an alarm means need only determine whether or not water is flowing. Paddle flow switches are commonly used to determine when flow occurs in commercial systems. As noted above, these are typically vane-type paddle flow switches.

In the MPS water regularly flows through the common piping. Flows occur to supply domestic needs within the residence. Whenever a sink, shower or toilet valve open, water flows in the MPS. Therefore, the alarm system used on typical commercial applications will not work for the MPS because simply taking a shower might cause a typical commercial flow detector to alarm when used with the MPS.

In light of this problem, typical residential applications have two completely different piping systems: (1) a fire sprinkler piping system, and (2) a domestic piping system. This basically doubles the number of pipes and the amount of plumbing work which has to be performed in a typical residential application. The same set of piping could not previously be used for both systems because the flow alarm could send false signals when domestic water was turned on. Alternatively, a residential application could use a fire detection system (i.e., smoke detector system). However, a smoke detection system does not alarm when water flows. Therefore, with a smoke detection system and no flow alarm, the fire sprinklers could run for days, causing extensive water damage, while the home owner is away on vacation and no alarm would sound. Also, smoke detection systems are expensive.

As noted above, U.S. patent application Ser. No. 09/098, 976 filed Jun. 1, 1998, disclosed an Apparatus And Method For Multi-Purpose Residential Water Flow Fire Alarm. The apparatus for use as a multi-purpose residential fire suppression water flow alarm system disclosed in that application was comprised of a supply side for delivering water under pressure; a multi-purpose piping system having a system side with common piping for delivering water from the supply side to a fire suppression side with one or more sprinkler heads and a domestic side for one or more domestic uses; a detecting means for detecting fire protection flow and for distinguishing that flow from a maximum domestic flow, the detecting means being disposed between the supply side and the system side; a drain test connection; and an alarm means. The method of utilizing the apparatus described above was also disclosed. One of the dependent claims from the above-noted application, claimed a detecting means comprised of an orifice plate through which water flows causing a differential pressure measured by a differential pressure switch so that the flow rate to the orifice plate is proportional to the differential pressure allowing a determination of flow rate based on the differential pressure measured.

It was disclosed that the flow detection means could utilize any number of well known flow measurement technologies, such as U.S. Pat. No. 5,288,469 to Otten et al. The Otten device incorporates both an orifice plate and a cone-shaped plug around which the water flows. U.S. Pat. No. 5,419,203 to Carmichael discloses a device similar to the device disclosed by Otten. Otten utilizes the Hall effect to measure the displacement of a displacement piston having incorporated therein a magnet. Carmichael utilizes strain sensors to measure the strain caused by displacement of a cone-shaped plug biased by a spring member. As the flow increases, the cone-shaped plug displaces backwardly in reaction to the flow putting greater pressure on the spring and consequently, greater pressure on the pressure sensors incorporated in the device. The Otten and Carmichael devices have several common features, namely a chamber having an orifice plate and a plug-shaped device adapted to be deflected away from the orifice plate in proportion to the flow rate through the chamber. The flow measurement means must be simple in both operation and concept so that it will be inexpensive to build and can be easily programed and calibrated in the field. The problem with Otten and Carmichael is that their devices allow flow therethrough the instant pressure is applied across the orifice plate. As disclosed, they are not capable of serving as a bypass means for allowing flow only when the differential pressure exceeds some preset level.

Critics of the MPS have also noted that it is common for residential systems to incorporate a water softener or similar devices (such as filters, chlorination systems, UV purifiers and the like). Water softeners and similar devices can create substantial drops in system pressure such that the water supply flowing through a typical residential system may not be sufficient for fire protection needs. Therefore, there is a need for a bypass mechanism which will allow sufficient flow in fire protection situations to bypass the water softener to supply the fire protection needs.

Prior art systems also suffered from problems with freezing. Where lines were in locations that could reach temperatures below freezing, it was a common problem to face freezing in the pipes, which could crack sprinkler heads and/or piping systems. Prior art systems addressed this problem in a number of ways, including dry pipe systems, which do not have any water in the piping until fire is sensed, by placing pipes in locations where they were not exposed to cold temperatures (for example, by placing insulation wrap over piping systems in favor of heated spaced below) and the like.

In prior art systems, typically, city water or other supply means are connected to a supply system leading into a structure. Water typically first flows through an outside gate valve. The gate valve is typically integrally connected with a water meter, though the two parts may be completely separate. After flowing through the gate valve and meter the water passes an exterior wall of the structure. A main control valve is provided in case it becomes necessary to shut off all the water in the structure. Though shown inside the structure the main control valve may also be outside. A pressure gauge may be provided to monitor water pressure in the system.

Where there are both domestic uses and a fire sprinkler system, a flow splitter divides the water supply into two distinct streams: (a) a fire side, and (b) a domestic side. Following the flow splitter a flow detection means is provided on the fire side. The flow detection means is coupled to an alarm means. Upon detection of flow by the flow detection means, a signal is sent to the alarm means, which creates an alarm condition therein. Piping leads away from the flow detection means to a drain/test connection. The drain/test connection serves two purposes: it allows the fire side to be drained, and it allows for simulation of the flow rate created by the operation of a sprinkler head. Piping also leads away from the flow detection means to at least one sprinkler head. A separate set of piping, the domestic side, leads to one or more domestic uses.

It is known that domestic uses of water can have a high enough flow rate to detract from fire protection needs. Therefore, the prior art also discloses a domestic water supply shut-off valve, which is effectively incorporated into the flow splitter for shutting off water supply to the domestic side. Such a shut-off valve is illustrated by U.S. Pat. No. 5,236,002 to Martin, et al. A typical National Fire Protection Association ("NFPA 13D") system requires two complete sets of piping, both fire side piping and domestic piping to be run throughout the structure. These two pipes running side by side require substantial increased material and labor costs to install. Further, for an existing structure, it may be extremely expensive or even impossible to install the second set of piping required for a fire sprinkler system.

The NFPA allowed the MPS because, in their estimation, the cost savings associated with single systems instead of duplicate systems, would cause the MPS to be installed in more homes, thus saving more lives. However, the NFPA provides no means for alarming upon a water flow condition in the MPS, which is a system where both domestic and fire protection systems use common piping.

With the MPS, again, a city or other domestic water supply is provided. The water flows through the outside gate valve and water meter through the outer wall of the structure. Thence the water flows through the main control valve.

A pressure gauge is typically provided to monitor water pressure in the system. No flow splitter is required for the MPS. There is no flow detection means with the MPS. As noted above, typical flow detection means alarm upon detection of a minimum flow. Therefore, given the common piping system in the MPS, typical domestic uses could cause the prior art flow detection means to send an alarm signal to the alarm means. NFPA provided for installation of a non-water-flow-based smoke detection and alarm system for use with the MPS. These non-water-flow-based smoke detection and alarm systems are expensive, and they are not capable of detecting flow through one or more fire protection sprinklers. The inability of a smoke detection system to detect and enunciate a water flow alarm could result in extensive water damage to the property.

Parent Applications

The parent applications (Ser. Nos. 09/483,999 and 09/098,976) disclosed the MPS with a water flow alarm. Since they envisioned the MPS, common piping carried water throughout the system. After passing through the main control valve, water passed by a pressure gauge, then through a flow detection means. In combination the flow detection means and the pressure gauge allowed for determination of whether the water supply is sufficient for fire protection needs. The flow detection means was connected to an alarm means which activated upon the detection of a flow rate greater than maximum domestic flow. Methods of detecting and measuring flow and alarming upon excessive flow are illustrated, for example, in Otten, et al., U.S. Pat. No. 5,228,469. Disposed after the detection means was a drain test connection. This drain test connection served the same purpose as it did in the prior art. The drain test connection also preferably included an orifice plate with interchangeable orifice plates for simulating different flow regimes. For example, one orifice plate could simulate the operation of a single fire sprinkler while another orifice plate simulated the domestic usage. These interchangeable orifice plates could then be used to calibrate the operation of the alarm means. Common piping carried water throughout the system to both domestic and fire protection uses. Rather than having distinct fire sides and domestic sides, the Parent Applications disclosed short sections of pipe split off from the common piping which were designated as either fire side or domestic side.

The Parent Applications also disclosed a flow sensor incorporating a combination orifice flow meter/displacement magnetic flow sensor in an annular housing. The annular housing was preferably be composed of a non-magnetic, metallic material, such as aluminum. Alternatively, the annular housing could be comprised of a polymer such as CPVC or similar materials. The material of construction was not critical so long as it did not interfere with the magnetic activation of the Reed switch. The annular housing had two ends, and at each end a bushing or reducer adapted to be threadedly (or by a socket) attached thereto to allow connection of an inlet pipe at an inlet end of the annular housing and an outlet pipe at an outlet end of the annular housing. A moving orifice plate, having a front face and a back face, was adapted to be received within the annular housing. The annular housing had at least one section with a continuous diameter defined therein for receiving the moving orifice plate. The moving orifice plate had a diameter which was slightly smaller than that of the continuous diameter section of the annular housing, allowing a sliding motion therein, but preventing excess fluid to flow around a periphery of the moving orifice plate. A moving plate opening was defined at or near the center of the moving orifice plate. An orifice plate magnet flange having a diameter larger than that of the moving plate opening was disposed on a back face. Disposed substantially around and outside the flange was a circular orifice plate magnet. The moving orifice plate was biased away from the outlet end by a orifice plate spring. The orifice plate spring was contained between an interior flange shoulder near the outlet end, and the orifice plate magnet. Mounted on an exterior portion of the annular housing was a Reed switch. The Reed switch was attached to the annular housing by an adjustable attachment means. Adjustment screws held the adjustable attachment means in place and allowed it to be loosened for movement of the Reed switch for calibration of the device.

The Parent Applications also disclosed another related embodiment of the combination orifice flow meter/displacement magnetic flow sensor. This embodiment was adapted to be used in systems where a water softener or similar pressure drop causing device is present. The outlet to the water softener was on the supply side of the sensor, and the inlet from the water softener was on the system side of the sensor. A "bullet rod" was held in place by a bullet port within the annular housing. The bullet port was comprised of an outer annular ring held in place between an annular shoulder and a bushing, support legs projecting inwardly from the annular ring, and an inner support ring. An open port area was defined between each of the support legs. Preferably, the sum of the open port areas was at least as large as the cross sectional area of the inlet pipe connected to the sensor, thus, the pressure drop through the device was minimized. A bullet rod having a head portion with a leading end and a threaded male end adapted to be received through the inner support ring was provided. A tail portion had a threaded female end adapted to threadedly engage the male end, so that the tail portion is held in place against the inner support ring. The tail portion also had a tapered end. The tapered end faced the outlet end of the sensor. The moving orifice plate opening was sized to receive the tail portion so as to allow sliding motion of the moving orifice place and also to minimize flow between the tail and the orifice plate. Thus, as the moving orifice plate was displaced toward the outlet end by differential pressure, substantially all of the flow was diverted through the water softener until the differential pressure displaced the orifice plate past the tapered end, at which point water flowed through the orifice in the orifice plate. As discussed below, preferably two Reed switches were provided, the first for a trouble alarm, and the second for enunciating the alarm means.

To reiterate, the problem to be solved by the Parent Application was provision of a water-flow-based means of alarming the MPS. In the past, such systems had to utilize two completely different piping systems: one for domestic uses and one for fire sprinkler system uses. Previous alarms used in these systems were designed to create an alarm condition upon the detection of a flow (commonly 8–10 gpm). Typical domestic flows could have caused an alarm in a prior art system. Alternatively, prior art systems used a smoke detection and alarm system which did not have a flow detector. These systems without a flow detector risked substantial water damage to the structure if a sprinkler head activated while no one was in the home.

The Parent Applications used the principle that domestic flow rates are much lower than flow rates needed for fire protection. Using a flow detection means, it was possible to create an alarm condition only upon detection of flows which are such as created by fire protection needs. Thus, an alarm condition was not created when typical domestic uses only were detected.

Preferably, the Parent Applications also incorporated a tamper detection means on the main control valve. The tamper protection means determined whether the main control valve was closed, and if so, enunciating a trouble alarm. A pressure gauge was also preferably provided in the system.

The combination orifice flow meter/displacement magnetic flow sensor disclosed in the Parent Applications preferably had two normally open Reed switches disposed thereon for detecting flow as indicating by displacement of the moving orifice plate. The first Reed switch was the same as previously disclosed, and enunciates a fire alarm via the fire alarm means. Preferably, the first Reed switch also activated a system which contacts emergency response personnel, such as fire departments. In addition to the fire alarm Reed switch, a second Reed switch may be provided. The second Reed switch enunciated a first stage "trouble alarm". Preferably, the first stage trouble alarm only enunciated within the structure (i.e., emergency response personnel were not contacted). The trouble alarm was created if the domestic usage was excessive. Where the system was used with the MPS, the first stage alarm would naturally cause anyone in the residence to instinctively shut off water, for example a shower they may be taking. As another example, if a resident heard a first stage alarm, and they were washing dishes, they would most likely shut off the sink faucet. This natural reaction to the first stage alarm may reduce the water flow demand below the level where the first stage alarm enunciates, eliminating the alarm condition. The first stage Reed switch is displaced a slight distance toward the inlet of the flow sensor relative to the fire alarm Reed switch. Thus, as the moving orifice plate is displaced towards the outlet end of the flow sensor, it will first activate the first stage Reed switch, enunciating the internal first stage trouble alarm. As the orifice plate continues to be displaced towards the outlet end, it will next activate the fire alarm Reed switch, which enunciates the alarm means, preferably notifying emergency response personnel. The relative linear displacement of the fire alarm Reed switch and the trouble Reed switch was to be set in the field so that there was sufficient differential in the flow which activates the first stage alarm and the fire alarm to give residents or occupants of the structures sufficient time to shut off domestic demands before a fire alarm is created. This two-stage system also serve as a safety back up, because if one of the alarm stages fail, the other still alerted residents to the potential alarm condition.

Tamper detection means on the main control valve preferably incorporated Reed switches as well. As the handle was turned, a magnet on the handle activated a normally open Reed switch, causing it to close, enunciating an alarm notifying the occupants of the structure that the main control valve had been closed, and the fire protection system was not being supplied with water. Again, this is an important safety consideration in residential systems where small children, unknowing homeowners, and the like can easily turn off the system without realizing they are shutting off their fire protection system as well.

Though the Parent Applications described the inventions therein with reference to a multi-purpose piping system, it should be understood that the system could be used with any flow-based system. Further, the flow detection means disclosed herein could be used with any flow system, not just fire protection systems. That is, the flow detection means are capable of detecting the flow of any fluid through a piping system. The piping system could carry hydrocarbons, solvents, or any other liquid or potentially gaseous materials for that matter.

In operation the apparatus disclosed in the Parent Applications functioned as both a domestic water supply system and a smoke detection and alarm system. Under normal conditions, the water flow rate through the flow detection means did not reach the fire suppression flow rates. When one or more sprinkler heads activated, the flow detection means detected the increased flow and sent an alarm to the alarm means. The alarm means enunciated a visible and/or audible alarm indicating the alarm condition. It is well known in the prior art to activate a telephone modem-based system for calling, for example, the fire department, upon detection of an alarm condition. See, e.g., Otten, U.S. Pat. No. 5,139,044. It was preferable to incorporate such a modem-based component in the present invention to notify the fire department and other emergency contacts should a fire alarm condition be detected. If one or more domestic cutoff valves were included in the apparatus, the flow detection means also sent a signal to activate the domestic cutoff valves, shutting off water to one or more domestic uses and providing more water for the fire sprinklers.

When the two-stage alarm system was provided, it was necessary to calibrate both the first stage trouble alarm and the first stage Reed switch. The preferred method was to first calibrate the fire alarm Reed switch. The calibration was very simple. First, the drain test connection is opened to simulate fire protection needs, the connection means for the Reed switch were loosened, and it was moved towards the inlet end of the sensor until an alarm condition was created. The first stage Reed switch was then moved a slight distance further towards the inlet end. A typical domestic demand was then created by using the drain test connection or flowing water from some number of plumbing fixtures. As the flow through the drain test connection exceeds the high end of the expected domestic demand, the first stage Reed switch should be activated, activating a first stage trouble alarm. If the alarm is not activated, the first stage Reed switch is moved further towards the inlet end of the sensor.

Shortcomings of the Prior Art

In prior systems it was often necessary to provide both a double check valve element and a flow detection/measurement/control sensor. Both of the elements increased the cost of this system and increased the pressure drop through the system. There was a need for a flow sensor that could both serve as a double check and as a flow detection or measurement means.

In multi-purpose piping systems, as well as stand-alone fire protection systems, there was the problem of stagnation (where water was to be used for human consumption) of water in the piping as well as the problem of freezing, where piping was exposed to temperatures lower than 32° Fahrenheit. Freezing presented itself as attic of a residence. There was therefor a need for a system which provides for the warming of pipes to prevent freezing, as well as circulation through the pipes to prevent stagnation.

Another problem that plagued prior art systems was the issue of retrofitting existing structures for fire protection systems. Retrofitting for a fire protection system in a typical structure would be very expensive because, where the freezing issue is a problem, piping would have to be installed in conduits below the ceiling of the structure (or at least under insulation) to prevent the danger of freezing.

SUMMARY OF THE INVENTION

It is therefore an object of the invention to provide an apparatus for flow detection and measurement. It is also an object to provide a method for using the disclosed apparatus in multi-purpose piping water flow fire alarm systems. The apparatus and method overcome one or more of the disadvantages of the prior systems.

It is an object of the present invention to provide an apparatus for flow detection and measurement. The apparatus for flow detection and measurement can incorporate a bypass means for allowing additional flow to pass through the flow measurement device as needed. When water is allowed to flow through the bypass means, an alarm may be enunciated should the flow reach a specified level. The objects of the apparatus are accomplished by providing a moving orifice plate with a magnet moving in cooperation therewith. The magnet activates a Reed switch on an external surface of the flow sensor when the moving orifice plate is displaced a sufficient distance by the flow passing through the sensor. When the water demand exceeds that which can flow through the primary path, the moving orifice plate is displaced beyond bullet rod allowing flow through the orifice.

It is a further object of the invention to provide a flow sensor which can serve as a double check valve. This object of the invention is achieved by providing a moving seat, in cooperation with the moving orifice plate, for providing two back flow prevention means. When water moves through the flow sensor in the desired direction, the moving seat allows water to pass thereby, and when sufficient water flows through the sensor, the moving orifice plate is displaced so that water can pass through the orifice therein. When water flows in the undesired direction, the moving seat is biased to cause a sealing action of a check o-ring against a check shoulder seat. Similarly, the moving orifice plate is biased so as to create a seal between an outer seat and an outer orifice o-ring, as well as between an inner seat and an inner orifice o-ring. Thus, in combination, the moving seat and the orifice plate provide a double check. Incorporating the double check technology, a single flow sensor can serve as a flow measurement device, a double check valve, a bypass means, as well as creating an electronic output signal for enunciating an alarm or the like.

It is an object of the present invention to provide a fire protection piping system having a water supply, a means for heating water, at least one fire protection sprinkler, a common piping means for receiving water from the supply, passing it through the heating means and delivering it to at least one fire protection sprinkler, and circulating means for circulating water through the common piping back to the heating means to maintain a specified minimum temperature in the common piping. By providing these elements, the danger of water freezing in the common piping is eliminated. In one embodiment, the circulation means comprises a pump controlled by a temperature measurement means for determining when the temperature of water in the piping drops below the minimum temperature specified. The controller engaging the pump which re-circulates the water in the piping through the heating means once the temperature drops below the desired level. At the same time, the recirculating of hot water through the system also eliminates the problem of stagnation.

It is also an object of the present invention to provide the foregoing advantages in a system where at least one domestic uses is also supplied with hot water by the common piping. When the present system is used in a multi-purpose piping system, homeowners have the added benefit of instant hot water from a faucet or the like.

It is an object of the present invention as well to provide a flow sensor which incorporates at least a single stage means for enunciating an alarm. The flow sensor may incorporate as many as three or more levels of alarm for the taking of various actions by the system upon the detection of the specified level of flow required to enunciate the alarm.

It is also an object of the present invention to provide a means to compensate for pressure drops in a typical MPS. More particularly, typical pressure drops include, but are not limited to, a water softener which may be placed in line in the system. Water softeners are typically used in multipurpose systems to improve the quality of water for domestic use in the residence. In addition to water softeners, pressure drops may include filters, UV treatment of water, and the like. There are many reasons why people want to treat water coming into their homes for domestic purposes. Many of these treatment means will reduce the pressure of the water through the MPS system. Thus, there may be a need for fire protection flows to bypass these pressure drops in the system, or to at least compensate for them. The present invention takes these types of pressure drops into account by providing a bypass means. In typical domestic flow situations, the entire flow of the water supply goes through the treatment method in question, such as a water softener. However, when the system side pressure drops below a set level, a relief allows additional flows through a lower pressure drop path.

By the same token, devices previously available for the measurement of flow caused another pressure drop. As noted above, pressure drops in the MPS can prevent sufficient flow from being available to satisfy fire protection needs. Therefore, it is also an object of the present invention to provide a volume flow detection and measurement means for use in the MPS which have minimal pressure drops. The flow detection means discussed are very simple in operation and easy to calibrate in the field. They may be used to provide a read out of the flow, or may simply provide an alarm when fire protection flows are detected.

It is also an object of the present invention to provide a flow measurement device with a higher capacity still for use in standard wet pipe systems. Under some circumstances, it may be desirable to use an expanded chamber system along with the orifice plate. In these systems, as the orifice plate is deflected backwardly by the water pressure, it moves into an area of expanded cross-section where the water can flow not only through the center of the orifice plate, but around the edges thereof. This expanded area minimizes the pressure drop through the flow sensor at high demands, such as is the case where multiple sprinkler heads may have activated.

It is an object of the invention to provide a system which can incorporate both a water softener and use of heated water from the hot water heater in the structure. As noted above, the bypass means may be the flow sensor as described herein. Alternatively, the bypass means may comprise a flow sensor for measuring fluid flowing through the common piping, a normally closed valve, and a controller in communication with the flow sensor and in a controlling position of the valve for opening the valve when demand for water exceeds the capacity of flow through either the heating means and/or the water softener. This valve-based bypass system requires mechanical intervention, so it is not as simple as the system incorporating the valve and the flow sensor with integral bypass means. However, it may be desirable in some applications.

A system for providing circulation of water around fire protection sprinklers, the system comprising, common piping carrying water, which water is caused to flow at periodic intervals; a head fitting receiving a fire protection sprinkler therein and further defining a chamber therein in communication with the sprinkler; supply and return lines for supplying water to and returning water from the head fitting; and a pump means for using the velocity head created by water flowing through the common piping to pump water to the head fitting causing circulation there through as a result of and in cooperation with flow through the common piping, is disclosed. As disclosed, the circulation systems does not require any mechanical input. That is, no pumps or motors are required for the pumping system. However, it is anticipated that in some cases it may be desirable to use a mechanical pump based on either electrical, air, or similar power means. In those cases, the pump will not rely on the velocity head of water flowing through the common piping.

It is also an object of the invention to provide a integrated system incorporating the above-noted elements of the invention and having a two-stage alarm for enunciating a pre-alarm, as well as a full-blown fire alarm. The integrated system has two sensors on the flow detection device, the first sensor enunciating a trouble alarm when a specified flow is created, and if the flow further increases, a second sensor enunciating a fire alarm, which also preferably calls emergency response personnel. The first trouble alarm is audible only in the residence or structure where the system is deployed. Preferably, as noted, the second fire alarm will contact emergency personnel, possibly via a telephone modem-type connection. The integrated system also preferably incorporates a tamper switch on a valve incorporated in the system to shut off the flow thereto. The tamper switch will enunciate if water flow to the fire protection system is shut off.

Finally, it is an object of the present invention to provide a shut off valve to automatically prevent water from flowing to a lawn sprinkler should a trouble or fire alarm be enunciated. The shut off valve would be activated by a controller or directly by the signal sent from the flow sensor, indicating that there was either a trouble alarm or a fire alarm condition. Where this shut off valve is incorporated into the present system, it may be preferable to have a normally closed Reed switch along with the other Reed switches, as shown on the flow sensor in FIG. 1, to close the normally closed shut off valve when a magnet is displaces sufficiently far to activate either the trouble alarm or the fire alarm.

There have thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in this application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. Additional benefits and advantages of the present invention will become apparent in those skilled in the art to which the present invention relates from the subsequent description of the preferred embodiment and the appended claims, taken in conjunction with the accompanying drawings. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention of the application which is measured by the claims, nor is it intended to be limiting as to the scope of the invention in any way.

BRIEF DESCRIPTION OF THE DRAWINGS

In the drawings:

FIG. 1 is a schematic diagram of one embodiment of the present invention.

FIG. 2 is a detailed cross-sectional drawing of a passive pump for use in the present invention to circulate water around and to sprinkler heads.

FIG. 3 is a detailed cross-sectional view of the head fitting to which the sprinkler head is attached to allow circulation thereto.

FIG. 4 is a detailed cross-sectional view of a flow sensor having an integral bypass means therein.

FIG. 5 is a detailed cross-sectional view of a flow sensor, which allows flow therethrough when the pressure drop across the flow sensor exceeds a preset limit.

FIG. 6 is a front view of the orifice plate used in the flow sensors shown in FIGS. 4 and 5.

FIG. 7 is a back view of the orifice plate shown in FIGS. 4 and 5.

FIG. 8 is a front view (as well as a back view since the front and back views are identical) of a bullet port used in the flow sensor shown in FIGS. 4 and 5 of the present invention.

FIG. 9 is a schematic of an alternative configuration of the present invention.

FIG. 10 is a schematic of still another alternative configuration of the present invention.

FIG. 12 is a detail side view of the moving seat for use with a double check valve.

FIG. 13 is a detail front view of the moving seat for use with a double check valve.

FIG. 14 is a detail back view of the moving seat for use with a double check valve.

FIG. 15 is a detail side view of the moving orifice plate for use with a double check valve.

FIG. 16 is a detail front view of a moving orifice plate for use with a double check valve.

FIG. 17 is a detail back view of a moving orifice plate for use with a double check valve.

FIG. 18 is a detail side view of the bullet port for use with a double check valve.

FIG. 19 is a detail front view of the bullet port for use with a double check valve.

FIG. 20 is a detail back view of the bullet port for use with a double check valve.

FIG. 21 is a cross-sectional view of another embodiment of a flow sensor incorporating a double check valve.

DESCRIPTION OF THE PREFERRED EMBODIMENTS

Figure 11:
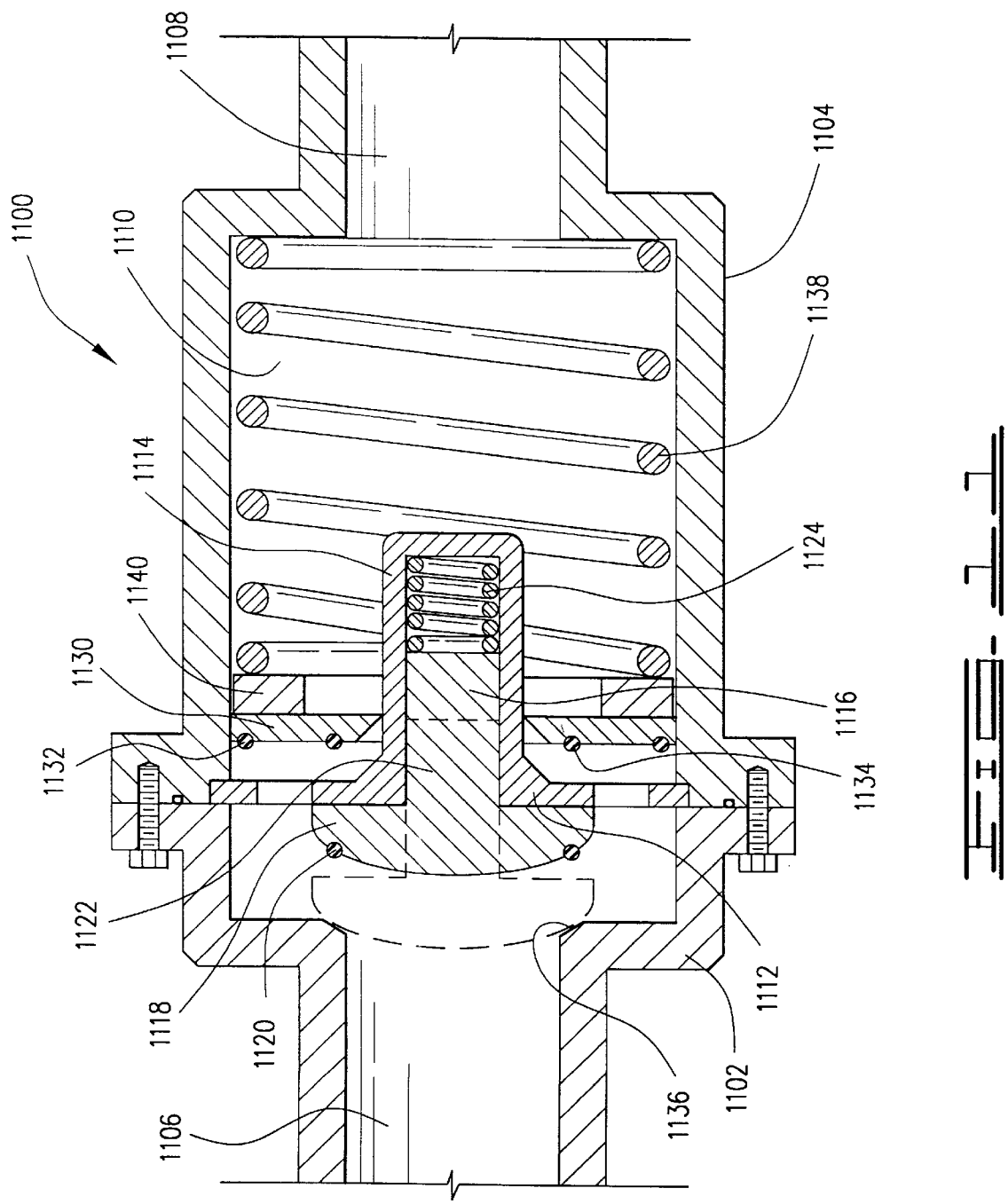
FIG. 11 is a cross-sectional view of a flow sensor incorporating a double check valve.

A flow sensor, from which the flow sensor disclosed herein was described in U. S. patent application Ser. No. 09/483,999, filed Jan. 18, 2000. That application disclosed a flow sensor, which could be used with a multi-purpose piping system for a fire suppression system/domestic water supply system in a structure. The device was disclosed as being used in a fire protection system, but it was noted that the sensor could be used in any flow measurement situation as well as in situations where a bypass means was desirable. The device disclosed more fully hereinafter, is intended to, and certainly can, be used in any appropriate flow measurement situation. It need not be a fire protection system, and the fluid need not be water. For example, in a petrochemical facility, a petrochemical may be passed through a reactor unit to cause a chance in its chemical structure. However, should the reactor become plugged, it may become desirable to have a bypass mechanism which allows the petrochemical to be vented to an emergency flare system, rather than causing a rupture or other failure of the reactor vessel. Such an application would be an appropriate use for the present flow sensor. The operation of the flow sensor described in the Parent Application is more fully described in the sections below.

One embodiment of a fire protection system incorporating the apparatus is illustrated in FIG. 1. The water from the water supply 100 first flows through a flow sensor 101 a passing through an inlet softener line 104 to a water softener 102 or similar water treatment or processing device and thence through the outlet softener line 106 back through the flow sensor 101a. The operation of the flow sensor 101a will be more fully described hereinafter, but for the present time it is sufficient to say that the flow sensor 101a typically directs water through the inlet softener line 104 through the water softener 102 and then back through the sensor to a first pipe section 108. However, whether there is an excessive water demand in the system, for example such as one caused by the operation of a fire protection sprinkler, there is a mechanism incorporated in the flow sensor 101a which allows water to bypass the water softener 102 increasing the flow rate through the system. The water, which is passed through the water softener 102, is next split, some of it passing into the cold water piping 110, and the rest of it passing into a second pipe section 112.

The water from the second pipe section 112 next passes through a second flow sensor 101b. A check valve 148 may also be incorporated in the second pipe section 112. The check valve 148 prevents back flow of water, which potentially could be stagnate from the fire protection system, to the cold water piping and/or the water softener. The second flow sensor 101b passes water down through a water heater 114 via an inlet heater line 116, and back to the sensor via an outlet heater line 118. Again, the second flow sensor 101b incorporates a bypass means which allows water to bypass the water heater where there is an excessive demand. After being heated, the water passes into a multi-purpose pipe section 120. Attached to the multi-purpose pipe section 120 are typical domestic uses such as a shower head 122 and a faucet 134. Other uses, such as toilets, dishwashers, washing machines, and the like may also be attached to the multi-purpose pipe section 120. Also in communication with the multi-purpose pipe section 120 are one or more sprinkler heads 128. As shown in FIG. 1, sprinkler heads are in communication via a passive pump 124 and a head fitting 126 with a multi-purpose pipe section 120. The operation of the passive pump 124 in cooperation with the head fitting 126 and the sprinkler heads 128 will be more fully described hereinafter. However, the purpose of the passive pump is to utilize the velocity head of water flowing through the multi-purpose pipe section 120 to circulate water to and around the sprinkler heads 128 to minimize stagnation thereat.

As shown in FIG. 1, two flow sensors are incorporated into the multi-purpose piping system. If there is no water softener, there will not be a need for the flow sensor 101a. The only flow sensor 101b will be on the hot water heater. Alternatively, it may be desirable to have only one flow sensor present at the water softener. In such a case, the flow sensor at the water softener will also measure the cold water flow, potentially contributing to more false alarms in the multi-purpose alarm system. However, this may be desirable where the risk of false alarms is not substantial, and the cost savings is sufficient enough to justify a single sensor at the water softener only. It is not believed that the hot water heater will cause a significant pressure drop in the flow therethrough. Therefore, the bypass means at the hot water heater is not believed to be necessary to ensure that adequate flow is available for fire protection needs. Rather, as shown, the advantages that the flow sensor placed on the hot water heater only measures the flow through the hot water domestic uses, as well as the flow to the fire protection sprinklers. Thus, the chance of a false alarm is minimized.

From the passive pump 124, water is passed to a head fitting 126. The water passes to the head fitting 126 from the multi-purpose pipe section 120 via the head supply line 130. It is returned to the multi-purpose pipe section 120 via the head return line 132. A reverse-j fitting 164 supplies water from the head fitting 126 to the sprinkler head 128. The purpose of the reverse-j fitting 164 is to cool the water supplied to the sprinkler head 128 to insure that the sprinkler head is not activated by the temperature of the water supplied thereto. Most sprinkler heads are set to activate at a temperature of 155° Fahrenheit. While it is not anticipated that hot water flowing through the multi-purpose piping system will exceed that temperature, the reverse-j fitting 164 helps to insure that just in case the water does exceed that temperature, the fire sprinkler is not inadvertently activated by water passing thereto.

As shown, a thermocouple 136 in communication with the pump controller 138 and control wiring 140 operates to ensure that a minimum desired temperature is maintained in the common piping 120. The thermocouple 136 measures the temperature of water in the common piping 120. If the temperature of the water drops below a preselected level (preferably at least 40° Fahrenheit), the pump controller 138 initiates the action of a pump 144. The pump 144 draws water from the common piping via a pump inlet pipe 142. A pump outlet pipe 146 directs water through a check valve and a return pipe 150 so that it is recycled through the water heater 114. The return pipe 150 connects to the inlet heater line 116 to complete the circuit. Thus, water moved by the pump 144 through the water heater 114 is reheated to maintain a minimum temperature in the multi-purpose pipe section 120.

An alternative embodiment is also shown in FIG. 1. The alternative embodiment includes a return leg supply pipe 152 and a return leg flow sensor 154. The return leg supply pipe 152 may be in communication with the first pipe section 108. The return leg flow sensor 154 normally prevents any water from flowing directly from the first pipe section 108 through the return leg supply pipe 152 into the multi-purpose pipe section 120. However, when an excessive water demand is made on the multi-purpose pipe section 120, the pressure may drop low enough so that the return leg flow sensor 154 allows water to pass there through directly from the first pipe section 108, bypassing the flow sensor 101b and the other elements of the water heater system. Alternatively, the return leg flow sensor 154 may draw water from the multi-purpose pipe section 120 at a point adjacent to the outlet from the flow sensor 101b.

As used herein, the multi-purpose pipe section 120 will often be referred to as "common piping." The "common piping" may include the second pipe section 112, the inlet heater line 116, the outlet heater line 118, the multi-purpose pipe section 120, the pump inlet pipe 142, the pump outlet pipe 146, as well as the flow sensor 101b. Further, in the embodiment shown in FIG. 1, the common piping includes all piping elements excluding the cold water system, and also excluding piping related to the water softener system. As noted above, in some circumstances it may be desirable to have the flow sensor with the fire alarm enunciation means located at the water softener. Where the flow sensor with the fire alarm enunciation means is located at the water softener, the term "common piping" will include the cold water piping, as well as the piping related to the water softener.

The flow sensor 101b incorporates a trouble Reed switch 156 and a fire Reed switch 158. An alarm annunciator is in electronic communication with the trouble alarm 160 and a fire alarm 162. Preferably, the fire alarm 162 will also have a remote notification feature, which could advise the fire department, for example, that a fire alarm condition exists in the structure. As shown, as a differential in the linear placement of the fire Reed switch 158 compared to the trouble Reed switch 156. This linear placement can be more clearly seen in FIG. 4. The remote notification feature will incorporate the use of a modem or other electronic dialing means to notify the police and play, for example, a pre-recorded message notifying the police and/or fire department of the fire alarm condition in the structure.

The operation of the passive pump 124 is illustrated in FIG. 2. The passive pump 124 is connected in-line in the multi-purpose pipe section 120. The passive pump 124 includes a body 200 defining a chamber 202 therein. The chamber 202 has an inlet 204 for receiving water from the multi-purpose pipe section 120 and an outlet 206 for passing on water to continue on through the multi-purpose pipe section 120. Also in communication with the chamber 202 is a head supply line 130 and a head return line 132. These lines are connected to the head outlet 208 and head return 210, respectively, in communication with the chamber 202. As shown, the head outlet 208 is simply a hole passing through a wall of the chamber 202 in communication with the head supply line 130. The head return 210, however, extends inwardly into the chamber 202. The opening 212 is thus directed toward the outlet 206 from the chamber 202. The head return 210 this has the appearance of a "Pitot tube." In cooperation, the head outlet 208 and the head return 210 work as a passive pump 124 using the velocity of fluid passing through the multi-purpose pipe section 120 to circulate water through the head supply line 130 and the head return line 132. Alternatively, the head outlet 208 could be formed as a Pitot tube facing the inlet 204 so that the velocity head pushes the water through the head outlet 210 and around the sprinkler head. There are certainly other ways that the velocity head of water passing through the multi-purpose pipe section 120 could be used to pump water around the sprinklers. Such ways as are commonly known to use a velocity head to cause water movement are intended to be incorporated in the spirit of this invention.

FIG. 3 shows the head fitting 126 with a reverse-j fitting 164 and a sprinkler head 128 attached thereto. The head fitting 126 is comprised of a fitting body 300. The fitting body 300 defines therein a fitting chamber 302 with a fitting inlet 304 and a fitting return 306. The head supply line 130 feeds the fitting inlet 304, and the head return line 132 carries water from the fitting return 306 back to the passive pump 124. The reverse-j fitting 164 extends upwardly from the body 300, then depends downwardly therefrom. The sprinkler head 128 is attached to the distal end 308 of the reverse-j fitting 164. As noted above, the reverse-j fitting 164 prevents activation of the sprinkler head 128 by hot water.

FIG. 4 is a cross-sectional view of a flow sensor 101b. The flow sensor 101b is comprised of an annular housing 402, for which, as shown, is comprised of a first housing portion 440 and a second housing portion 442. The first and second housing portions, 440 and 442, are connected at a flange 444, via flange bolts 446. The annular housing 402 has a main inlet port 404 for receiving water from a supply source. The annular housing 402 also has a main outlet port 406 for delivering water to downstream needs. Disposed on sides of the annular housing 402 are a device outlet port 408 and a device inlet port 410. The annular housing 402 also has a first gauge port 412 and a second gauge port 414 for attachment of pressure gauges, flow gauges, or such other gauges as may be desirable to attach to monitor the operation of the flow sensor 101. Defined within the annular housing 402 is a chamber 416. A bullet port 418 is seated on a annular seat 424 at the flange 444. The bullet port 418 is illustrated in FIG. 8, below. Attached to the bullet port 418, using a bullet rod bolt 422 is a bullet rod 420. A magnet 426 and orifice plate 428 are biased against the bullet port 418 by a spring 432, which rests on a spring seat 448. The orifice pate 428, which is shown generally in FIGS. 6 and 7, has defined thereon a magnet seat 430 for maintaining communication with the magnet 426.

In a preferred embodiment, two Reed switches are disposed on the outside of the annular housing 402. The Reed switches are attached to the housing using Reed switch clips 438. The Reed switch clips 438 are simply u-shaped components which snugly receive the generally round Reed switches, and which are attached to the annular housing 402 with screws. Loosening the screws on the Reed switch clips 438 allows for the Reed switches to slide closer to or farther away from the main inlet port 404 of the annular housing 402. Note there is a linear displacement between the trouble Reed switch 156 and the fire Reed switch 158. Thus, as the moving orifice plate 428 is displaced towards the outlet end by increased flow, the magnet in cooperation therewith first enunciates the trouble alarm, then, as the flow continues to increase, it later enunciates a fire alarm.

As will be more fully described in the Operation section below, water flows into the flows sensor 101 through the main inlet port 404. In typical operation, it is directed out through the device outlet port 408 through a flow device, such as a hot water heater or a water softener. Once the water has passed through the device, it is returned to the flow sensor 101 through the device inlet port 410. It then continues out of the flow sensor 101 through the main outlet port 406. However, when the downstream water demand exceeds the capability of water to flow through the device, the orifice plate 428 begins to be biased towards the outlet end by the differential pressure. Once the differential pressure becomes large enough, the orifice plate is displaced past the end of the bullet rod 420, allowing water to flow through the orifice, to increase the flow passing through the flow sensor 101.

FIG. 5 illustrates a return leg flow sensor 154, which is somewhat like the flow sensors 101a and 101b. The primary difference in the configuration shown is that the flow sensor has the magnet on the inlet side of the orifice plate, while the return leg flow sensor 154 has the magnet on the outlet side of the orifice plate. In addition, the main difference is that the return leg flow sensor 154 does not have device inlet and outlet ports, 410 and 412, respectively. The sole purpose of the return leg flow sensor 154 is to allow additional water to flow through the orifice when the pressure at the outlet drops below some specified level. As noted, it could draw water from a different part of the system, as may be desirable in a given application.

The return leg flow sensor 154 is comprised of a first housing portion 500 and a second housing portion 502. It incorporates an inlet 504 and an outlet 506. Disposed within the sensor is a bullet port 508 having an outer annular ring 510, and to which is attached a bullet rod 512. The bullet rod 512 has a head portion 514 and a tail portion 516, and is secured to the bullet port 508 by a bullet rod bolt 518. As shown, the bullet rod bolt 518 screws into the tail portion 516 using bullet rod threads 520 defined in the tail portion 516. Again, the orifice plate 524 with a magnet 526 adjacent thereto is biased against the bullet port 508 by a spring 528.

FIGS. 6, 7, and 8 illustrate in detail, the construction of the orifice plate 428 and the bullet port 418. The orifice plage 428 incorporates a magnet seat 430 on a first face 602. Of court, the orifice plate 428 also incorporates an orifice 600, which is simply a hole passing there through. Preferably, the orifice 600 will have a diameter equal to the inside diameter of the multi-purpose piping 120, though a smaller orifice may be functional. A circular magnet is adapted to fittingly engage the magnet seat 430 and rest against the first face 602. The second face 700 of the orifice plate 428 is illustrated in FIG. 7. The magnet seat 430 is shown in outline in this view.

FIG. 8 illustrates the bullet port 418. The bullet port 418 is comprised of an outer annular ring 800, and support legs 804 extending inwardly and attach to an inner support ring 802, which defines a bullet bolt hole 806 therein. Flow holes 808 are therefor defined in the bullet port 418, which allow water to pass there through. As shown, the support legs 804, both have a wide profile. However, it is preferable that the support legs 804 have a thin cross-section facing the flow of fluid entering the bullet port 418. That is, instead of having the thicker portion of the support legs face the fluid flow towards the support legs, they could be turned so that the thinner cross section of the support legs faces the flow and the wider section is perpendicular to the direction of the flow. This would minimize the pressure drop through the bullet port.

An alternative feature for the present invention is illustrated in FIG. 9. As shown, the invention is incorporated in the water softener portion of the system. However, should a system be built without a water softener, the present invention could be incorporated on the water heater portion of the system, to-wit: instead of the valve being disposed in the inlet water softener line 104 it would be disposed in the inlet heater line 116. However, as shown, the water supply enters the sensor 101*a*. The inlet softener line 104 carries the water from the sensor 101*a* to the water softener 102. An actuated value 900 is disposed in the inlet softener line 104. An actuated valve 900 is controlled by a controller 902. The controller has at least two settings: first, a setting for when the structure is occupied; an second, a setting for when the structure is unoccupied. In a preferred embodiment, the controller is a security system, commonly installed in residences and the like. When the controller 902 is a security system, it will preferably have three settings: first, a security setting for use at night primarily where the residents want to be alerted if there is a security breach of the residence, but it is necessary to allow flow through the multi-purpose piping systems; second, a disarm setting where the residents do not want the security system to alert them of any security breaches, and the residents want to allow flow through the multi-purpose system; and third, a setting where minimal flow is desired, and the residents want to be alerted of any security breaches. The third setting would typically be used when the residents have left the structure during the day for work or for extended periods, such as for a vacation. In the first and second settings, the controller 902 operates the actuated valve so as to allow flow therethrough when there is a water demand in the structure. In the third setting, a demand for flow in the structure, above some minimal flow allowed, for example, for refilling toilets and supplying an ice maker, instead of activating the actuated valve, instead activates as alarm means. The alarm may either be solely within the structure or it may alert external authorities, such as the fire department. In this mode, it is presumed that any significant flow through the multi-purpose piping system is either caused by a fire or by a piping leak in the structure. The leak could be, for example, the breaking of a supply line for a clothes washer.

FIG. 10 illustrates still another potential embodiment of the present invention. Again, the device is shown where a water softener is provided, but if the water softener is not present, the analogous components of the water heater will be substituted for the water softener. The water supply 100 passes through a main control valve with Reed switch 1008. The main control valve with tamper Reed switch 1008 is in communication with a controller 1010. From there, it passes through a flow sensor 1000. The flow sensor 1000 incorporates a valve Reed switch 1002, a trouble Reed switch 1004, and a fire Reed switch 1006. When the flow through the flow sensor 1000 exceeds the level, which can be anticipated to be met by the water softener 102, the valve Reed switch 1002 sends a signal to the controller 1010 to open a bypass valve 1012. The bypass valve 1012 serves the same function of as the flow sensor 101*b* in FIG. 1, to-wit: when the demand for water exceeds the ability of the water softener to produce it, the valve allows additional flow, for example for fire protection needs. If the demand becomes still greater, a trouble Reed switch 1004 is activated enunciating a trouble alarm 1114. Finally, if the flow continues to increase, the fire Reed switch 1006 is activated enunciating a fire alarm 1116, which may preferably notify external authorities such as the fire department. The three-stage Reed switch would not be useful with the flow sensor shown in FIG. 4 because the third Reed switch is provided to activate a valve. No valve actuation is required for the operation of the flow sensor 101*b*, rather it is operated mechanically by selecting an appropriate spring tension to allow the system to operate at the desired pressure. However, the Reed switch on the main valve 1008 is desirable to notify occupants that the valve supplying the fire suppression system is closed.

FIG. 11 illustrates a double check configuration of a flow sensor. The double check flow sensor 1100 is generally shown in FIG. 11. It is comprised of substantially a first housing portion 1102 and a second housing portion 1104. At an end of the first housing portion 1102 is a main inlet port 1106, and a main outlet port 1108 is disposed at an end of the second housing portion 1104. In cooperation, the first housing portion 1102 and second housing portion 1104 define a chamber 1110 therein. Disposed in the chamber 1110 is a bullet port 1112 integrally connected to a bullet rod 1114. The bullet rod 1114 defines therein a cylinder 1116. A moving check 1118 has a check piston 1122 which is slidingly received within the bullet cylinder 1116. A check o-ring 1120 is disposed on the moving check 1118 for sealing against the check shoulder seat 1136. A check spring 1124 disposed in the bullet cylinder 1116 biases the moving check 1118 towards the check shoulder seat 1136. Disposed between the bullet port 1112 and the main outlet port 1108 is a moving orifice plate 1130. On the moving orifice plate 1130 are an outer orifice o-ring 1132 and an inner orifice o-ring 1134. An orifice spring 1138 biases the orifice plate 1130 in cooperating a magnet 1140 towards the main inlet port 1106, and away from the main outlet port 1108.

The moving check 1118 is generally shown in FIGS. 12 through 14. FIG. 12 is a cross-sectional view of the moving check 1118. It incorporates a leading edge 1200, as well as a piston end 1202 opposite from the leading edge 1200. A shoulder 1204 is also defined. A periphery 1206 extends around the terminal portion of the leading edge 1200. The check piston 1122 is sized to be slidingly received within the bullet cylinder 1116. The check o-ring 1120 is sized so as to sealingly seat against the check shoulder seat 1136. FIG. 13 is a front view of the moving check 1118 showing the leading edge 1200 and the check o-ring 1120. FIG. 14 is a rear view of the moving check 1118 showing a shoulder 1204 and the piston end 1202.

FIGS. 15 through 17 illustrate the moving orifice plate 1130. FIG. 15 is a detailed cross sectional view of the moving orifice plate 1130. The first face 1500 faces the main inlet port 1106. Disposed thereon are an outer orifice o-ring 1132 and an inner orifice o-ring 1134. A second face 1502 is opposite the first face 1500. An orifice 1504 passes from the first face 1500 to the second face 1502, defining a hole therethrough. The orifice 1504 is sized to slidingly receive the bullet rod 1114 therein.

FIGS. 18 through 20 generally illustrate the bullet port 1112. FIG. 18 is a detailed cross sectional view of the bullet port 1112. An outer annular ring 1800 and an inner support ring 1802 are generally shown. Extending away from the inner support ring 1802 is the bullet rod 1114. The outer annular ring 1800 defines an outer seat 1804, and the inner support ring 1802 defines an inner seat 1806. The outer orifice o-ring 1132, and the inner orifice o-ring 1134 are designed to sealingly engage the outer and inner seats 1804 and 1806, respectively. At a terminal portion of the bullet rod 1114, a rod end 1808 is defined. It is anticipated that the rod end 1808 will be closed, though there may be a hole therethrough to allow the check piston 1122 to freely move within the bullet cylinder 1116 without creating a vacuum. FIG. 19 is a front view of the bullet port 1112 showing the support legs 1900, and the flow holes 1902 defined by void spaces surrounded by the support legs 1900, the outer annular ring 1800 and the inner support ring 1802. FIG. 20 is a back view of the bullet port 1112, again showing the same features, as well as showing the rod end 1808.

FIG. 21 illustrates an alternative embodiment of a double check flow sensor. As shown in FIG. 21, a nylon-coated magnet serves both as the source of the magnetic field and as the moving orifice plate—a combination orifice plate/magnet 2130. The flow sensor 2100 is comprised of a first housing portion 2102 and a second housing portion 2104. Defined within the two housing portions is a chamber 2110 with a main inlet port 2106 and a main outlet port 2108. A bullet port 2112 is fixed at a juncture between the first and second portions 2102 and 2104. The bullet port 2112 incorporates a bullet rod 2114 extending outwardly therefrom. Defined within the bullet rod is a bullet cylinder 2116 for slidingly receiving the check piston 2122 portion of a moving check 2118. A check o-ring 2120 is disposed on the moving check for sealing engagement with a check shoulder seat 2136. An orifice/magnet spring 2138 is disposed within the chamber 2110 for biasing the orifice plate/magnet 2130 toward the main inlet port 2106 and away from the main outlet port 2108. Similarly, a check spring 2124 is disposed in the bullet cylinder 2116 for biasing the moving check 2118 toward the main inlet port 2106 and away from the main outlet port 2108. A Reed switch 2140 is shown disposed on an outer wall of the second housing portion 2104.

Operation

In operation, water flows into the system from a water supply 100 to a flow sensor 101a. Typically, a flow sensor 101a diverts water through an inlet softener line 104 to the water softener for treatment, however, when a demand exceeds the ability of water to flow through the water softener, a bypass mechanism incorporated in the flow sensor 101a allows water to short circuit, and not pass primarily through the water softener, but flow through to the first pipe section 108. Similarly, the flow sensor 101b receives water from the second pipe section 112. Typically, water is diverted downward through the inlet heater line 116 through a water heater for heating, back up through the outlet heater line 118, and then on to the multi-purpose pipe section 120. However, when the demand for water exceeds the ability of water to flow through the water heater, a bypass mechanism allows water to flow from a second pipe section 112 through the flow sensor 101 to the multi-purpose pipe section 120.

This bypass mechanism is allowed to occur by the operation of a flow sensor 101, the design of which is shown generally in FIG. 4. The bypass mechanism of the flow sensor 101 operates without the need for any electronics or any external sensors. Rather, an orifice plate 428 has an orifice 600, which is adapted to closely receive a bullet rod 420. Once the orifice 600 has received the bullet rod 420, water cannot pass there through. A spring 432 is adapted to bias the orifice plate 428 towards a bullet port 418. Therefore, in a no-flow condition, the orifice plate 428 is held against the bullet port 418 by the spring 432. However, as water begins to flow around the bypass mechanism through a device, a pressure drop caused by a restriction is developed between the main inlet 404 and the main outlet 406, which forces the orifice plate 428 to compress the spring 432 backwardly towards the main outlet 406. If the pressure difference becomes large enough, the orifice plate 428 is displaced backwardly far enough so that the orifice plate 428 clears the bullet rod 420 and water can flow through the orifice 600.

A magnet 426 is received against the orifice and seated on a magnet seat 430. As shown in FIG. 4, the magnet 426 is on the inlet side of the orifice 600, but it may also be on the outlet side as shown in FIG. 5. The magnet 426 moves in cooperation with the orifice plate 428. The magnetic field created thereby will operate a trouble Reed switch 156 when it becomes in a close enough proximity thereto, and subsequently a fire Reed switch 158 as it continues to move backwardly. By the time the magnet 426 approaches the fire Reed switch 158 close enough to activate it, it has cleared the bullet rod 420, and water is flowing through the bypass means.

Normally, open Reed switches complete a circuit to send a signal as they are activated. The trouble Reed switch 156 preferably activates an alarm, which only sounds in the structure where the system is located. This alerts the residents that the water usage is approaching the fire protection level, and that if they want to avoid a fire alarm they need to reduce their water usage. The fire Reed switch 158 preferably activates a system with remote notification. That is, when the fire Reed switch 158 is activated, a call is made to a fire department or other monitoring authority, so that they can respond to the fire condition which has apparently been created in the structure. The flow required to activate the fire Reed switch 158 should not occur except in circumstances where a fire sprinkler has activated in response to a fire. The Parent Applications discuss the different flow regimes between typical domestic uses and flow regimes required for fire protection. It is important to calibrate the location of the Reed switches, which can slide either toward the outlet or away from the outlet by loosening the Reed switch clips 438. The calibration of this system is described in the Parent Applications.

A passive pump 124 only operates when water flows to the multi-purpose pipe section 120. Since this is a multi-purpose pipe section, water will flow through the multi-purpose pipe section 120 on a regular basis to supply, for example, shower heads 122 or faucets 134. In addition, where a pump 144 is provided to maintain re-circulation to maintain a minimum temperature, the pump 144 will also provide flow through the multi-purpose pipe section 120. When there is flow through the multi-purpose pipe section 120 there will be velocity head associated therewith. The passive pump 124 takes advantage of this velocity head. As water passes into the chamber 202, a differential pressure is created by the configuration of the inlet 204 and the outlet 206 such that water is drawn into the inlet 204 and pulled out of the outlet opening 212. A vacuum of sort is created by facing the outlet opening 212 away from the inlet 204. Thus, the velocity head is used to create a flow through the supply and return lines, 130 and 132, respectively.

However, when a fire sprinkler head 128 activates, the water demand will be so great that water will be supplied to the head fitting through both the head supply and head return lines 130 and 132, respectively. That is, both lines operate as supply lines when a fire sprinkler operates. It has the advantage of allowing small supply lines to be used than would be required if only one line were in place. In addition, there is a redundancy because even if a plug were to develop in one of the lines, the other line would probably not be plugged and would still provide water to the sprinkler head.

The operation of the return leg flow sensor 154 will be illustrated with reference to FIGS. 1 and 5. In many respects, the return leg flow sensor 154 is like the flow sensor 101. However, it does not have the inlet or outlet ports for devices such as water softeners nor need to have an alarm output. The only purpose of the return leg flow sensor 154 is to allow flow there through when the differential pressure from the inlet 504 to the outlet 506 increases to an extent indicating that additional water flow needs to be allowed. Again, when the differential pressure rises to that level, the orifice plate 524 is displaced to pass the end of the bullet rod 512 allowing flow through the orifice 600. Internally, the flow sensor 101 is attached both to the first pipe section 108 and to the tail end of the multi-purpose pipe section 120. It is conceivable that where there are multiple sprinkler heads attached to the multi-purpose pipe section 120, during a fire, there may less than sufficient water to feed the sprinkler heads toward the end of the multi-purpose pipe section 120. Therefore, additional water would be allowed to pass through the return leg flow sensor 154 feeding these sprinklers at or near the end of the multi-purpose pipe section 120. This additional water supply would assist these sprinklers in doing their job of suppressing a fire.

The double check valve in operation generally operates like the flow sensor shown in either FIG. 4 or FIG. 5. However, it has the added feature of the moving check, as well as o-rings disposed on the moving orifice plate for sealing engagement with the bullet port. The flow passes through the double check flow sensor 1100 in the desired direction, that is, entering the main inlet port 1106 and passing out the main outlet port 1108 and passing therethrough, the check valves are not activated. However, where there is a pressure gradient which would force flow from the main outlet port 1108 backwards through the main inlet port 1106, the orifice plate 1130 is biased, both by the pressure gradient and by the check spring 1124 towards the inlet port 1106. This causes the outer orifice o-ring 1132 and the inner orifice o-ring 1134 to sealingly seat against the outer seat 1804 and inner seat 1806 of the bullet port 1112. Similarly, both the check spring 1124 and the pressuring gradient bias the moving check 1118 towards the inlet port 1106. Thus, the check o-ring 1120 sealingly seats against the check shoulder seat 1136. Thus, the flow sensor having all of the characteristics of the flow sensors shown in FIGS. 4 and 5 is provided, but having the additional benefit of serving as a double check valve. The operation of the double check flow sensor shown in FIG. 21 is the same. However, the flow sensor shown in FIG. 21 incorporates a combination orifice plate/magnet 2130 for fewer parts and lower cost.

While the invention has been shown, illustrated, described and disclosed in terms of specific embodiments or modifications, the scope of the invention should not be deemed to be limited by the precise embodiment or modification therein shown, illustrated, described or disclosed. Such other embodiments or modifications are intended to be reserved especially as they fall within the scope of the claims herein appended.

What I claim is:

1. A system for providing circulation of water in piping supplying fire protection sprinklers, the system comprising:
    a. common piping carrying water, which was is caused to flow at periodic intervals;
    b. a head fitting receiving a fire protection sprinkler therein and further defining a chamber therein in communication with the sprinklers;
    c. supply and return lines for supplying water to and returning water from the head fitting, the lines being in communication with the common piping; and
    d. a pump means for using the velocity head created by the water flowing through the common piping to pump water to the head fitting causing circulation there through as a result of flow in the common piping.

2. An apparatus for use as a flow sensor comprising:
    a. an annular housing to be installed in the flow path of a fluid, the annular housing defining a chamber therein which has a fixed interior diameter in at least one section and a main inlet and outlet;
    b. a moving orifice plate defining an opening therein where the orifice plate has an outer diameter which is smaller than the diameter of the fixed section of the annular housing, but is sized so as to allow minimal flow of water around its edges and between the diameter of the annular housing;
    c. a magnet adapted to abut and move with the orifice plate;
    d. a biasing means for urging the moving orifice plate and magnet away from the outlet; and e. at least one Reed switch disposed on an outer surface of the annular housing for creating an electronic signal related to the position of the orifice plate magnet within the annular housing, the Reed switch being attached so as to be easily movable in relation to and annular housing, whereby as fluid flows through the annular housing the orifice plate is urged towards to outlet end of the annular housing causing a change in the electronic signal created by the Reed switch.

3. The apparatus of claim 2 further including a bullet rod axially disposed within the annular housing so as to be received within the orifice plate opening, blocking flow through the opening until a specified differential pressure is reached when the orifice plate is displaced past the bullet rod allowing flow through the opening.

4. The apparatus of claim 2 further including a device outlet port on the inlet side of the moving orifice plate for delivering water to an external device and a device inlet port on the outlet side of the moving orifice plate for returning water from the device, whereby the apparatus serves as a bypass mechanism which typically diverts flow through the external device, but allows bypass flow through the moving orifice plate when flow demand exceeds a flow capacity of the external device.

5. The apparatus of claim 2 further comprising:
1. the bullet rod further defining a bullet cylinder therein;
2. the inlet port defining a check shoulder seat;
3. a moving check having a check piston slidingly received in the cylinder, a leading edge bearing a first seal means for sealing engagement with the check shoulder seat, and a piston end;
4. a biasing means disposed in the bullet cylinder for biasing the moving check toward the inlet port;
5. second seal means disposed on the moving orifice plate for sealing engagement with the bullet port, whereby, when fluid flows therethrough from the inlet to the outlet, the moving check is biased away from the inlet port allowing flow through the apparatus, and moving orifice plate in proportion to the flow rate, but fluid flow is prevented from flowing from the outlet to the inlet by a first seal formed between the first seal means and the bullet port and a second seal formed between the second seal means and the check shoulder seat preventing flow in the undesired direction.

6. The apparatus of claim 5 where the first and second seal means are o-rings adapted to engage sealing surfaces.

7. The apparatus of claim 5 where the magnet and the orifice are combined into a single piece.

8. The apparatus of claim 5 where the combined orifice plate/magnet is coated with a material for allowing it to form a seal directly with the bullet port.

9. A piping system of the type having a water supply, a means for heating water, common piping means for receiving water from the supply and delivering it to at least one use, circulation means for circulating water through the common piping back to the heating means to maintain a minimum specified temperature in the common piping, whereby the danger of freezing water in the piping is eliminated, the piping system of supplying at least one fire protection sprinkler and at least one non-fire protection use, the improvement comprising: a bypass means for diverting water around a flow impediment where water demands exceed the flow capacity of the impediment and for sensing flow comprising:
a. an annular housing to be installed in the flow path of the common piping;
b. a moving orifice plate defining an opening therein;
c. a magnet adapted to a abut the face of the orifice plate and move in cooperation therewith;
d. a biasing means for urging the moving orifice plate away from an outlet end of the annular housing;
e. at least one Reed switch disposed on a outer surface of the annular housing for creating an electronic signal related to the position of the magnet within the annular housing, the Reed switch being attached so as to be easily movable in relation to the annular housing, whereby, as fluid flows to the annular housing the orifice plate is urged towards the outlet end of the annular housing causing a change in the electronic signal created by the Reed switch; and
f. a bullet rod axially disposed within the annular housing so as to be closely received within the orifice plate opening, blocking flow through the opening until a specified differential pressure is reached when the orifice plate is displaced past the bullet rod allowing flow through the opening.

10. The system of claim 9, where two Reed switches are incorporated on the annular housing, first a Reed switch for enunciating a trouble alarm, and a second Reed switch for enunciating a fire alarm.

11. A piping system of the type having a water supply, a means for heating water, common piping means for receiving water from the supply and delivering it to at least one use, circulation means for circulating water through the common piping back to the heating means to maintain a minimum specified temperature in the common piping, whereby the danger of freezing water in the piping is eliminated, the piping system of supplying at least one fire protection sprinkler and at least one non-fire protection use, the improvement comprising: a bypass means for diverting water around a flow impediment where water demands exceed the flow capacity of the impediment and for sensing flow comprising:
a. a flow sensor;
b. a normally closed valve; and
c. a controller in communication with the flow sensor and controlling the position of the valve for opening the valve when the demand for water exceeds the capacity of the flow impediment so as to bypass it.

12. The system of claim 11 where three alarm levels are provided: a first level which opens the valve; a second level which sounds a trouble alarm; and a third level which enunciates a fire alarm.

13. A piping system of the type having a water supply, a means for heating water, common piping means for receiving water from the supply and delivering it to at least one use, circulation means for circulating water through the common piping back to the heating means to maintain a minimum specified temperature in the common piping, whereby the danger of freezing water in the piping is eliminated, the piping system of supplying at least one fire protection sprinkler and at least one non-fire protection use, the improvement comprising: supplying at least one domestic use with hot water through the common piping means.

14. The system of claim 13, incorporating a device between the heating means and the water supply and a bypass means for diverting water around the device when the water demand exceeds the flow capacity of the device.

15. A piping system of the type having a water supply, a means for heating water, common piping means for receiving water from the supply and delivering it to at least one use, circulation means for circulating water through the common piping back to the heating means to maintain a minimum specified temperature in the common piping, whereby the danger of freezing water in the piping is eliminated, the piping system of supplying at least one fire protection sprinkler and at least one non-fire protection use, the improvement comprising: providing a short circuit means for supplying more water to the common piping means near the circulation means where water demand exceeds the capacity of the capacity of the common piping means, the short circuit means having a. an annular housing to be installed in the flow path;

b. a moving orifice plate defining an opening therein;

c. a biasing means for urging the moving orifice plate away from an outlet into the annular housing;

d. a bullet rod actually disposed within the annular housing so as to be received within the orifice plate opening, blocking flow through the opening until a specified differential pressure is reached when the orifice plate is displaced past the bullet rod allowing flow through the opening.

16. The system of claim 15 incorporating a device between the heating means and the water supply and a bypass means for diverting water around the device when the water demand exceeds the flow capacity of the device.

17. A piping system of the type having a water supply, a means for heating water, common piping means for receiving water from the supply and delivering it to at least one use, circulation means for circulating water through the common piping back to the heating means to maintain a minimum specified temperature in the common piping, whereby the danger of freezing water in the piping is eliminated, the piping system of supplying at least one fire protection sprinkler and at least one non-fire protection use, the improvement comprising: each fire protection sprinkler having associated therewitha. a head fitting receiving a fire protection sprinkler therein and further defining a chamber therein in communication with the sprinkler via a reverse-J fitting to insulate the sprinkler head from hot water supplied to the head fitting;

b. supply and return lines for supplying water to and returning water from the head fitting, the lines being in communication with the common piping;

c. a pump means for using the velocity head created by the water flowing through the common piping to pump water to the head fitting causing circulation there through as a result of flow in the common piping.

18. A piping system of the type having a water supply, a means for heating water, common piping means for receiving water from the supply and delivering it to at least one use, circulation means for circulating water through the common piping back to the heating means to maintain a minimum specified temperature in the common piping, whereby the danger of freezing water in the piping is eliminated, the piping system of supplying at least one fire protection sprinkler and at least one non-fire protection use, the improvement comprising:

a. a normally closed actuated valve disposed between the bypass means and the device; and b. a controller for controlling the valve such that in a first state, the valve is opened in response to a water demand from the common piping and in a second state, the actuated valve remains closed, and an alarm signal is sent to the controller in response to a significant water demand from the common piping, whereby, when a structure is unoccupied and the controller is in the second state, an alarm condition is created when a water demand beyond minimal domestic uses is detected.

19. The system of claim 18 further including a water softener disposed between the water supply and the heating means, the bypass means being disposed between the water supply and the water softener.

20. A piping system of the type having a water supply, a means for heating water, common piping means for receiving water from the supply and delivering it to at least one use, circulation means for circulating water through the common piping back to the heating means to maintain a minimum specified temperature in the common piping, whereby the danger of freezing water in the piping is eliminated, the piping system of supplying at least one fire protection sprinkler and at least one non-fire protection use, and a bypass means for diverting water around a flow impediment where water demand exceeds flow capacity of the impediment, the improvement comprising:

a. a main control valve disposed on the supply side of the bypass means with a Reed switch on the valve for sending an alarm signal if the valve is closed;

b. the bypass means havingi. a flow sensor means for measuring the flow therethrough and creating a first output when the measured flow exceeds capacity of the impediment, a second trouble alarm output and a third fire alarm output, ii. an actuated valve providing an alternate flow path around the flow impediment when opened, and iii. a controller for receiving a signal from the main control valve and enunciating an alarm if it is closed, and for receiving a signal from the flow sensor and for sending a signal to open the actuated valve when flow demand exceeds the capacity of the flow impediment, enunciating a trouble alarm when the flow exceeds a second level, and enunciating a fire alarm when the flow exceeds a third level.

* * * * *